US009679355B2

(12) United States Patent
Murahashi

(10) Patent No.: US 9,679,355 B2
(45) Date of Patent: Jun. 13, 2017

(54) IMAGE PROCESSING DEVICE

(71) Applicant: Sharp Kabushiki Kaisha, Osaka-shi, Osaka (JP)

(72) Inventor: Yoshimitsu Murahashi, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/036,868

(22) PCT Filed: Jan. 13, 2015

(86) PCT No.: PCT/JP2015/050663
§ 371 (c)(1),
(2) Date: May 16, 2016

(87) PCT Pub. No.: WO2015/115168
PCT Pub. Date: Aug. 6, 2015

(65) Prior Publication Data
US 2016/0307293 A1  Oct. 20, 2016

(30) Foreign Application Priority Data
Jan. 28, 2014 (JP) ................. 2014-013010

(51) Int. Cl.
*G06T 3/40* (2006.01)
*H04N 5/208* (2006.01)
(Continued)

(52) U.S. Cl.
CPC ............. *G06T 3/40* (2013.01); *G06K 9/6215* (2013.01); *G06T 5/00* (2013.01); *G06T 5/003* (2013.01);
(Continued)

(58) Field of Classification Search
CPC .......... G06K 9/6215; G06T 3/40; G06T 5/00; G06T 5/003; G06T 5/20; G06T 2207/20024; H04N 5/208
See application file for complete search history.

(56) References Cited

U.S. PATENT DOCUMENTS 6,594,404 B1 *  7/2003 Smith ................. G06T 3/40
345/660
2010/0166334 A1 *  7/2010 Zhang ................. G06T 3/00
382/263

(Continued)

FOREIGN PATENT DOCUMENTS

JP          5281690 B2   9/2013

*Primary Examiner* — Edward Park
(74) *Attorney, Agent, or Firm* — Keating & Bennett, LLP

(57) ABSTRACT

Provided is an image processing device capable of reproducing an original thin linear image region from a linear image region, which has become thick due to upscaling processing for a low-resolution image. In an image processing device (100), an amplitude estimation unit (1) calculates a magnification a in a local region so that an input image signal becomes similar to a low-resolution pattern PtnL. A similarity calculation unit (2) outputs a similarity s, which has a great value, at a pixel position which is similar to the low-resolution pattern PtnL. An FIR filter unit (4) sets an FIR filter coefficient by a difference pattern PtnDiff, receives a product of the magnification a and the similarity s, and performs FIR filter processing, and thereby acquires a high frequency component ΔD. Then, when the high frequency component ΔD is added to an input image Din by an adder (5), an output image Dout having excellent definition is acquired.

9 Claims, 20 Drawing Sheets

(51) Int. Cl.
  *G06K 9/62* (2006.01)
  *G06T 5/00* (2006.01)
  *G06T 5/20* (2006.01)

(52) U.S. Cl.
  CPC ............... *G06T 5/20* (2013.01); *H04N 5/208* (2013.01); *G06T 2207/20024* (2013.01)

(56) References Cited

U.S. PATENT DOCUMENTS

| | | |
|---|---|---|
| 2011/0279730 A1 | 11/2011 | Goshi |
| 2015/0023611 A1* | 1/2015 | Salvador ............... G06T 3/4053 382/263 |
| 2016/0239946 A1* | 8/2016 | Naruse ................... G06T 5/003 |

* cited by examiner

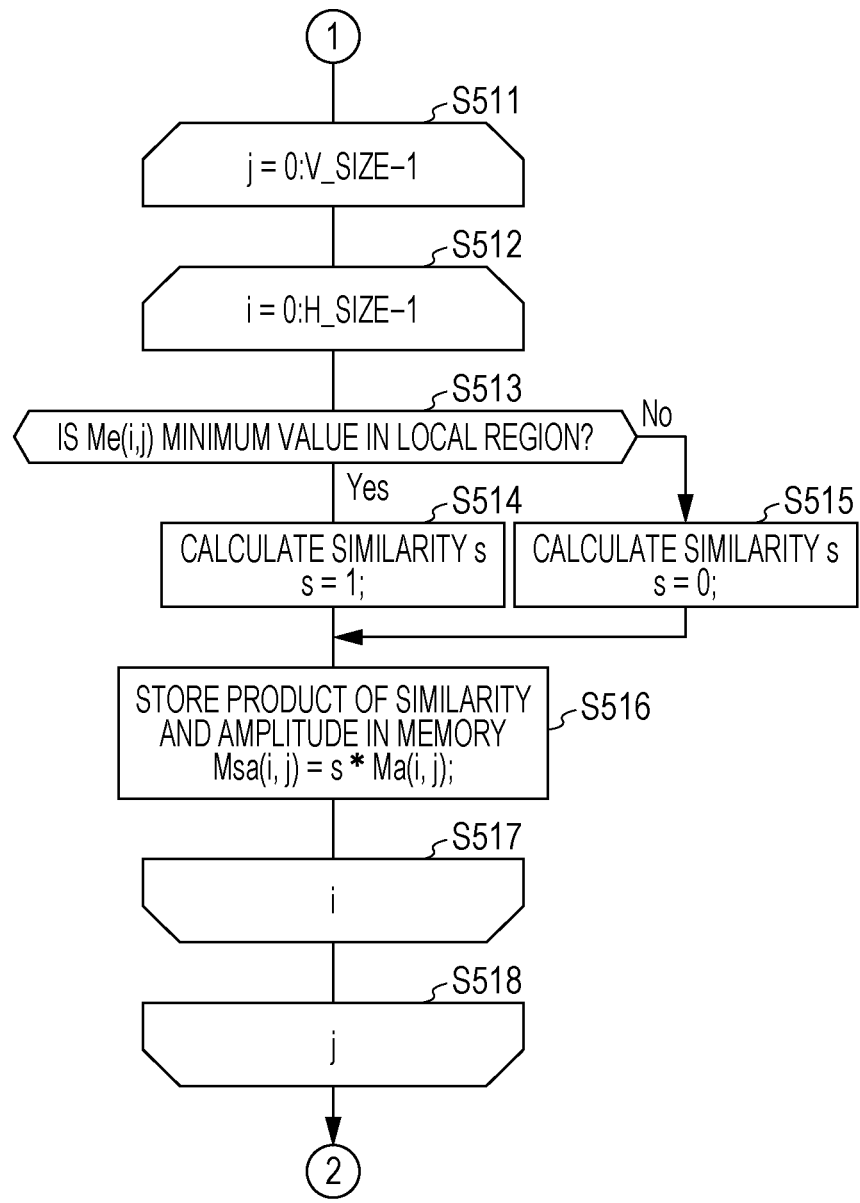

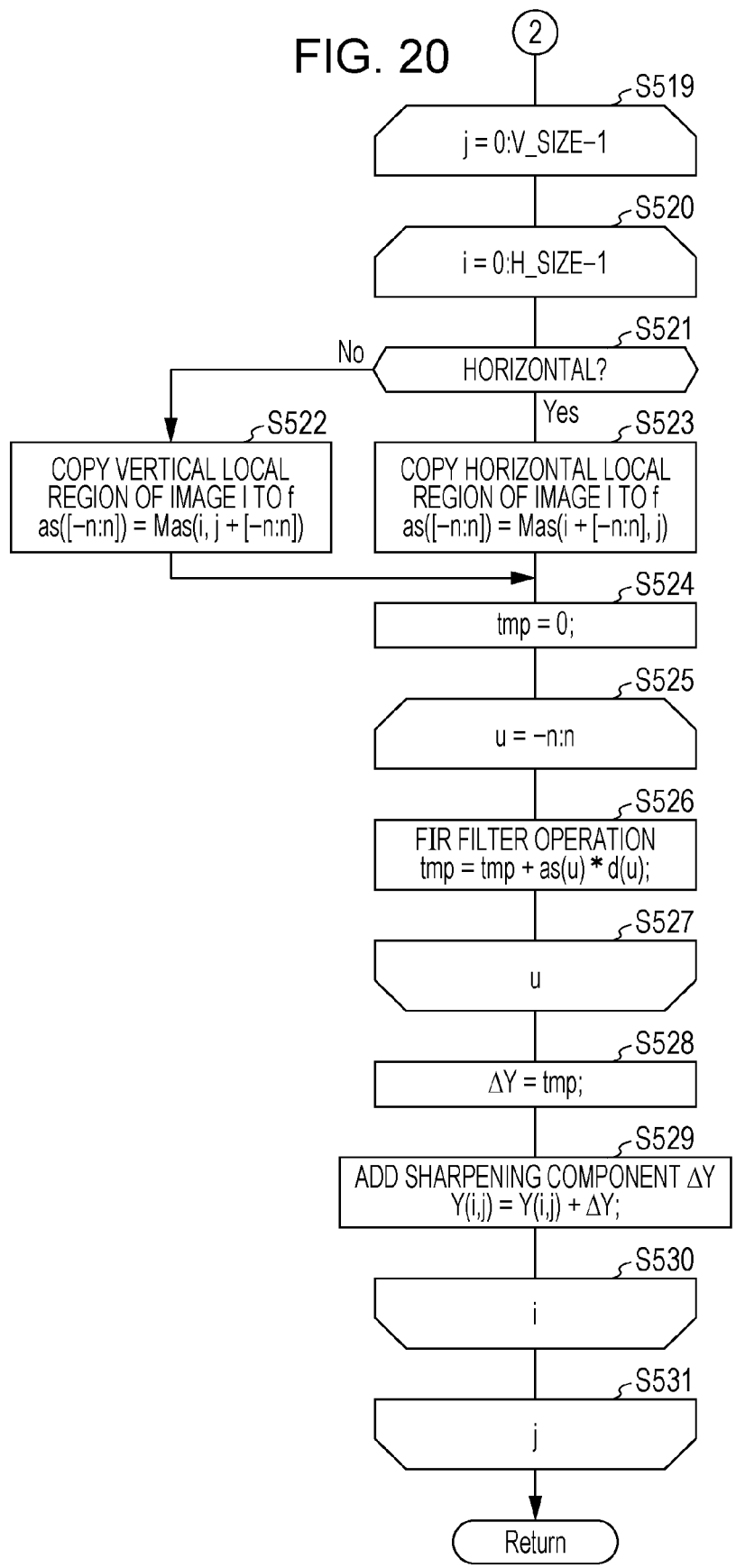

IMAGE PROCESSING DEVICE

TECHNICAL FIELD

The present invention relates to an image processing technique and, for example, relates to a technique of appropriately improving details in an image for which upscaling processing is executed.

BACKGROUND ART

In general, when a low-resolution image (video) with, for example, an SD (Standard Definition) image quality is displayed on a high-resolution display which displays a high-resolution image (video) with, for example, an HD (High Definition) image quality, the low-resolution image (video) is subjected to processing called upscaling (upscaling processing) by which an input image (video) is enlarged (zoomed) in order to display the input image (video) on the whole of the display. However, when the image (video) for which the upscaling processing is merely executed is displayed as it is on the high-resolution display, the image (video) gives a blurred impression compared with an image (video) with the true HD image quality. Thus, in a case where a low-resolution image (video) with the SD image quality or the like is subjected to upscaling, processing of sharpening an image (image sharpening processing) may be executed with respect to the image (video) after the upscaling processing.

Generally, it is necessary to compensate a high frequency component in order to reproduce details of an image, which are lost due to upscaling processing or the like.

For example, in a technique disclosed in PTL 1 (Japanese Patent No. 5281690), a high frequency component is extracted from an input image signal, limit processing is performed on the extracted high frequency component, and the high frequency component after the limit processing is added to the input image signal. Accordingly, with the technique disclosed in PTL 1, it is possible to acquire a signal in which a high frequency component of an input image signal is enhanced.

SUMMARY OF INVENTION

Technical Problem

However, in the technique disclosed in PTL 1, the processing is performed only by enhancing the high frequency component included in the original signal (input image signal) and, therefore, it is difficult to appropriately execute image sharpening processing in some cases.

For example, in the case of upscaling a low-resolution image, a part (image region) of a thin line such as a hair becomes thick. Even if a high frequency component included in such an image (image signal) is enhanced in this image (image signal) as in the conventional technique, the line which has become thick or the like is merely enhanced as being thick (for example, enhanced so that an outline of the line becomes clear), and it is difficult to reproduce the thin line before upscaling.

That is, in the conventional technique, the processing is performed only by enhancing the high frequency component included in the original signal (input image signal), so that it is difficult to perform processing of enhancing a component in a signal band higher than that of the original signal (input image signal) and to reproduce the original thin line from the line which has become thick due to upscaling processing. Moreover, since the processing of adding, to the input image signal, the high frequency component included in this image signal is executed in the conventional technique, there is also a problem that noise is unnecessarily enhanced with respect to an input image signal having large amplitude, or that overshoot is excessively caused with respect to an input image signal having large amplitude.

In view of the aforementioned problems, the invention aims to realize an image processing device capable of reproducing an original thin linear image region from a linear image region, which has become thick due to upscaling processing for a low-resolution image, without enhancing a noise component unnecessarily or causing overshoot excessively.

Solution to Problem

In order to solve the aforementioned problems, a first configuration is an image processing device which sharpens an input image and includes an amplitude estimation unit, a similarity calculation unit, a multiplier, an FIR filter unit, and an adder.

The amplitude estimation unit acquires a magnification a so that a difference between an adjusted low-resolution pattern data sequence acquired by multiplying a low-resolution pattern data sequence, which is acquired by performing downscaling processing and then performing upscaling processing for a high-resolution pattern data sequence, by the magnification a and a pixel data sequence in a local region that is a predetermined range of the input image, which includes a pixel to be processed, is equal to or less than a predetermined value.

The similarity calculation unit sets a similarity value of the pixel to be processed to be a value indicating that a degree of similarity between the adjusted low-resolution pattern data sequence and the pixel data sequence is higher as the difference between the adjusted low-resolution pattern data sequence and the pixel data sequence is smaller in the local region.

The multiplier multiplies the magnification a and the similarity for each pixel to be processed.

The FIR filter unit executes FIR filter processing with respect to a multiplication value of the magnification a and the similarity. The multiplication value is acquired by the multiplier. The FIR filter unit executes for each pixel to be processed the FIR filter processing using an FIR filter coefficient which is a difference pattern data sequence acquired by subtracting the high-resolution pattern data sequence from the low-resolution pattern data sequence and thus the FIR filter unit acquires high frequency component data $\Delta D$ of the pixel to be processed.

The adder adds for each pixel to be processed pixel data of the pixel to be processed and the high frequency component data $\Delta D$ of the pixel to be processed, which is acquired by the FIR filter processing.

Advantageous Effects of Invention

According to the invention, it is possible to realize an image processing device capable of reproducing an original thin linear image region from a linear image region, which has become thick due to upscaling processing for a low-resolution image, without enhancing a noise component unnecessarily or causing overshoot excessively.

BRIEF DESCRIPTION OF DRAWINGS

FIG. 19 is a flowchart of the image processing method of the second embodiment.

FIG. 20 is a flowchart of the image processing method of the second embodiment.

DESCRIPTION OF EMBODIMENTS

First Embodiment

A first embodiment will be described below with reference to drawings.

<1.1: Configuration of Image Processing System>

Figure 1:
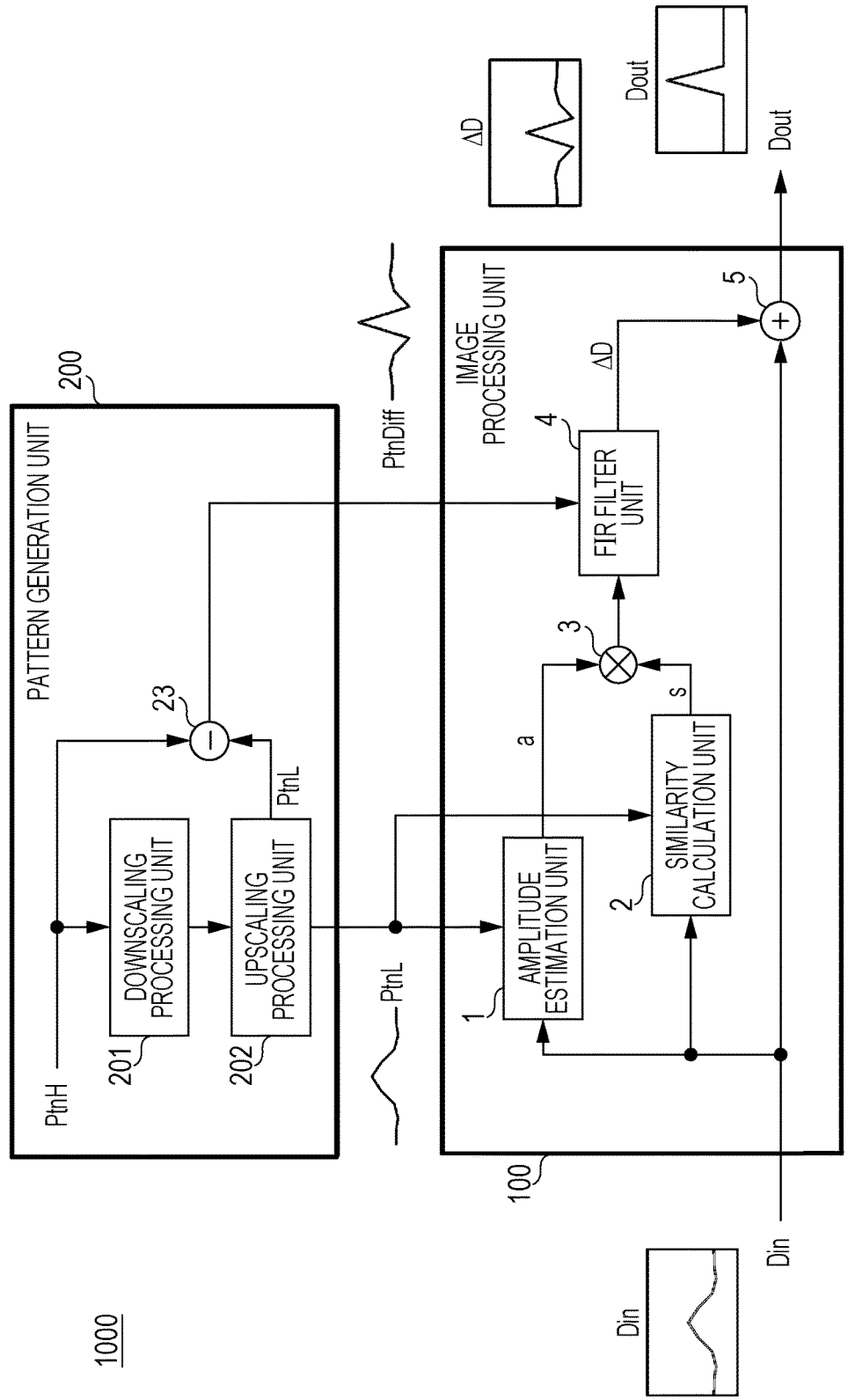
FIG. 1 is a schematic configuration diagram of an image processing system 1000 according to a first embodiment.

FIG. 1 is a schematic configuration diagram of an image processing system 1000 according to the first embodiment.

As illustrated in FIG. 1, the image processing system 1000 includes an image processing unit (image processing device) 100 and a pattern generation unit 200.

As illustrated in FIG. 1, the image processing unit 100 includes an amplitude estimation unit 1, a similarity calculation unit 2, a multiplier 3, an FIR filter unit 4, and an adder 5.

The amplitude estimation unit 1 receives an input image (input image signal) Din and a low-resolution pattern signal PtnL which is output from the pattern generation unit 200. The amplitude estimation unit 1 acquires an estimated amplitude value a based on the input image signal Din and the low-resolution pattern signal PtnL, and outputs the acquired estimated amplitude value a (signal indicating the estimated amplitude value a) to the multiplier 3.

The similarity calculation unit 2 receives the input image (input image signal) Din and the low-resolution pattern signal PtnL which is output from the pattern generation unit 200. The similarity calculation unit 2 acquires a similarity value s based on the input image signal Din and the low-resolution pattern signal PtnL, and outputs the acquired similarity value s (signal indicating the similarity value s) to the multiplier 3.

The multiplier 3 receives the estimated amplitude value a (estimated amplitude value signal a) output from the amplitude estimation unit 1 and the similarity value s (similarity value signal s) output from the similarity calculation unit 2. The multiplier multiplies the estimated amplitude value a (estimated amplitude value signal a) and the similarity value s (similarity value signal s) which are input, and outputs a signal acquired by the multiplication processing to the FIR filter unit 4.

The FIR filter unit 4 receives a difference pattern signal PtnDiff which is output from the pattern generation unit 200 and the multiplication resultant signal of the estimated amplitude value a (estimated amplitude value signal a) and the similarity value s (similarity value signal s) output from the multiplier 3. The FIR filter unit 4 sets a filter coefficient of an FIR filter based on the difference pattern signal PtnDiff, and executes FIR filter processing with respect to the signal (multiplication resultant signal) output from the multiplier 3. Then, the FIR filter unit 4 outputs the signal after the FIR filter processing to the adder 5 as a difference signal ΔD.

The adder 5 receives the input image (input image signal) Din and the difference signal ΔD output from the FIR filter unit 4. Then, the adder 5 adds the input image signal Din and the difference signal ΔD, and outputs a signal, which is acquired by this addition processing, as an image signal Dout.

As illustrated in FIG. 1, the pattern generation unit 200 includes a downscaling processing unit 201, an upscaling processing unit 202, and a subtractor 23.

The downscaling processing unit 201 receives a high-resolution pattern signal PtnH, and executes downscaling processing with respect to the input high-resolution pattern signal PtnH. Then, the downscaling processing unit 201 outputs the signal after the downscaling processing to the upscaling processing unit 202.

The upscaling processing unit 202 receives the signal output from the downscaling processing unit 201, and executes upscaling processing with respect to the input signal. Then, the upscaling processing unit 202 outputs the signal after the upscaling processing to the amplitude estimation unit 1 and the similarity calculation unit 2 in the image processing unit 100 as the low-resolution pattern signal PtnL. In addition, the upscaling processing unit 202 outputs the low-resolution pattern signal PtnL also to the subtractor 23.

The subtractor 23 receives the high-resolution pattern signal PtnH and the low-resolution pattern signal PtnL which is output from the upscaling processing unit 202, and performs processing of subtracting the high-resolution pattern signal PtnH from the low-resolution pattern signal PtnL. Then, the subtractor 23 outputs a signal acquired by this subtraction processing to the FIR filter unit 4 in the image processing unit 100 as the difference pattern signal PtnDiff.

<1.2: Operation of Image Processing System>

Description will be given below for an operation of the image processing system 1000 configured as described above.

First, in order to explain a principle of the invention, description will be given with reference to FIG. 2 for a principle for expressing a line thinly by taking, as an example, an image (video) obtained by once applying downscaling to a high-resolution image (for example, an HD video) and applying upscaling again to the resultant.

Figure 2:
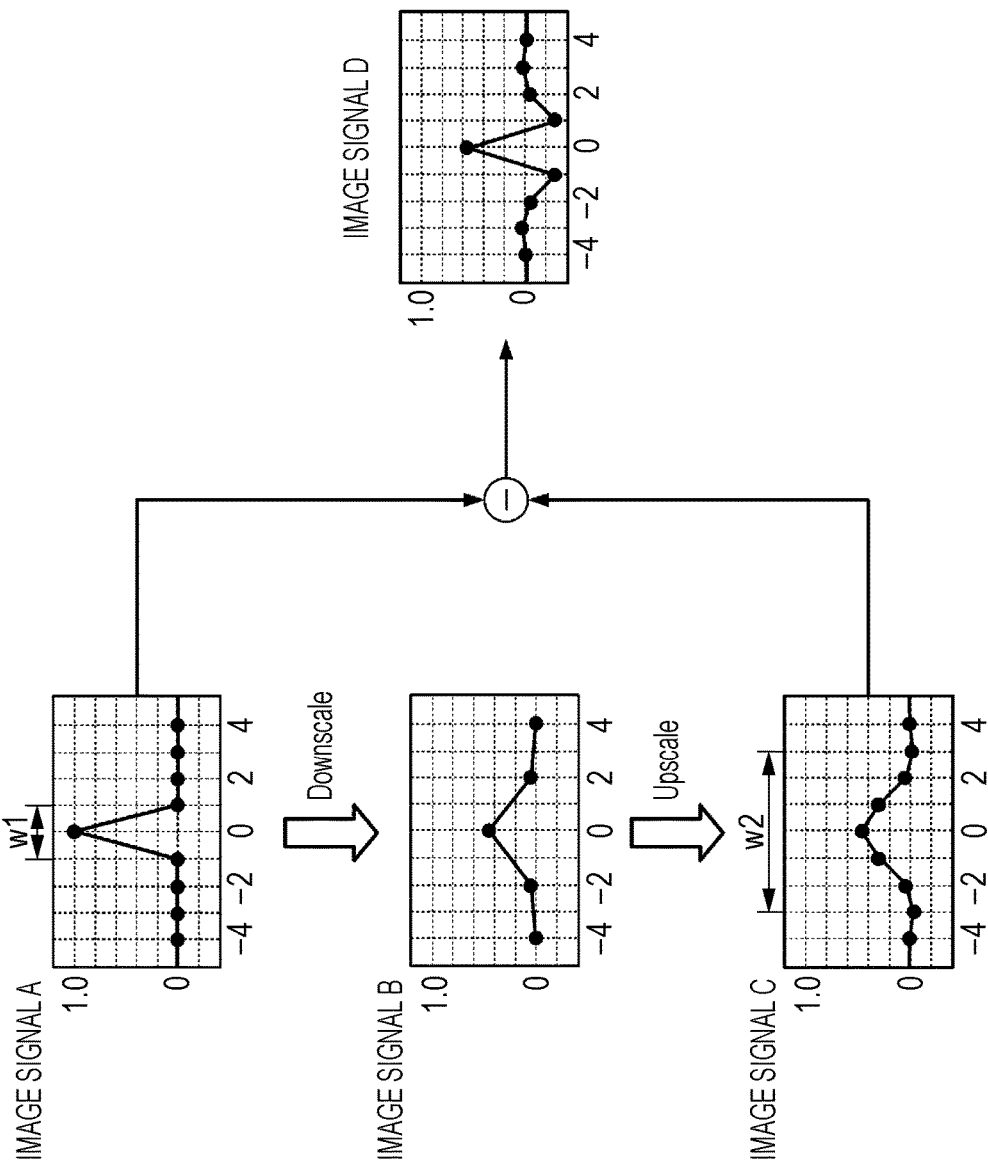
FIG. 2 is a diagram for explaining a principle of thinning processing.

FIG. 2 is a diagram for explaining the principle of thinning processing. Note that, for simplification of the description, data on a one-dimensional axis (for example, a horizontal axis) of a two-dimensional image is extracted and illustrated as one-dimensional data in FIG. 2.

In FIG. 2, image signals A to D are illustrated by setting a lateral axis as a coordinate position of the one-dimensional axis (for example, the horizontal axis) and setting a longitudinal axis as a pixel value (for example, a luminance value).

As illustrated in FIG. 2, the image signal A is an image signal which forms an image corresponding to a line having a line width w1 in a one-dimensional axis (for example, the horizontal axis) direction (extending in a direction orthogonal to the one-dimensional axis direction) (for example, a line extending in a vertical axis direction), for example.

The image signal B is an image signal after downscaling processing (for example, decimation processing and smoothing processing) is executed with respect to the image signal A.

The image signal C is an image signal after upscaling processing (for example, interpolation processing and smoothing processing) is executed with respect to the image signal B. That is, the image signal C is an image signal after the image signal A having a true HD image quality becomes the image signal B by being subjected to downscaling once and the image signal B is subjected to upscaling again.

The image signal D is a difference signal acquired by subtracting the image signal C from the image signal A. That is, (image signal $D$)=(image signal $A$)−(image signal $C$).

As can be seen in FIG. 2, in the image signal C, a peak of a pixel value (luminance value) of a part corresponding to the line having the line width w1 in the image signal A becomes about a half, and a line width thereof becomes w2 whose thickness is about three times as thick as the line width w1.

As one of the causes of a lack of feeling of excellent definition in the image signal C subjected to the upscaling, it is considered that a thin line in an original image becomes thick in an image subjected to upscaling, as described above.

If it is possible to restore thinness of the width (line width) w2 of a line part of the image signal C to that of the line width w1 of the image signal A which is the original image, excellent definition is able to be obtained in an image formed with the image signal C.

Then, in the image processing system 1000, a signal indicating a pattern of the image signal C is set as the low-resolution pattern signal PtnL, and, in a case where a signal pattern (signal sequence) similar to the low-resolution pattern signal PtnL appears in the input image signal Din, a signal indicating a pattern of the image signal D is added to the input image signal Din. Accordingly, an image (video) having excellent definition, such as the image signal A, is acquired in the image processing system 1000.

Based on such a principle (way of thinking), the low-resolution pattern signal PtnL corresponding to the image signal C in FIG. 2 and the difference pattern signal PtnDiff corresponding to the image signal D (difference signal D) in FIG. 2 are generated from the high-resolution pattern signal PtnH corresponding to the image signal A in FIG. 2 in the pattern generation unit 200. Specifically, in the pattern generation unit 200, processing is executed as follows.

The high-resolution pattern signal PtnH is input to the downscaling processing unit 201 and the subtractor 23.

In the downscaling processing unit 201, downscaling processing (for example, decimation processing and smoothing processing) is executed for the high-resolution pattern signal PtnH. Then, the signal for which the downscaling processing is executed is output to the upscaling processing unit 202.

In the upscaling processing unit 202, upscaling processing (for example, interpolation processing and smoothing processing) is executed with respect to the signal output from the downscaling processing unit 201, and thereby the low-resolution pattern signal PtnL is acquired. The acquired low-resolution pattern signal PtnL is then output to the subtractor 23, the amplitude estimation unit 1 in the image processing unit 100, and the similarity calculation unit 2 in the image processing unit 100.

In the subtractor 23, processing of subtracting the low-resolution pattern signal PtnL from the high-resolution pattern signal PtnH is executed, and thereby the difference pattern signal PtnDiff is acquired. That is, by processing corresponding to $Ptn\text{Diff}=PtnH-PtnL,$ the subtractor 23 acquires the difference pattern signal PtnDiff.

The difference pattern signal PtnDiff acquired by the subtractor 23 is then output to the FIR filter unit 4 in the image processing unit 100.

(1.2.1: Amplitude Estimation Processing)

In the amplitude estimation unit 1 in the image processing unit 100, amplitude estimation processing is executed with respect to the input image signal Din by using the low-resolution pattern signal PtnL.

Specifically, the amplitude estimation unit 1 calculates a magnification a (amplitude a) with which a difference of the input image signal Din and a signal obtained by multiplying the low-resolution pattern signal PtnL by a and adding b to the resultant becomes the minimum in a local region u. This will be described by using FIG. 3.

Figure 3:
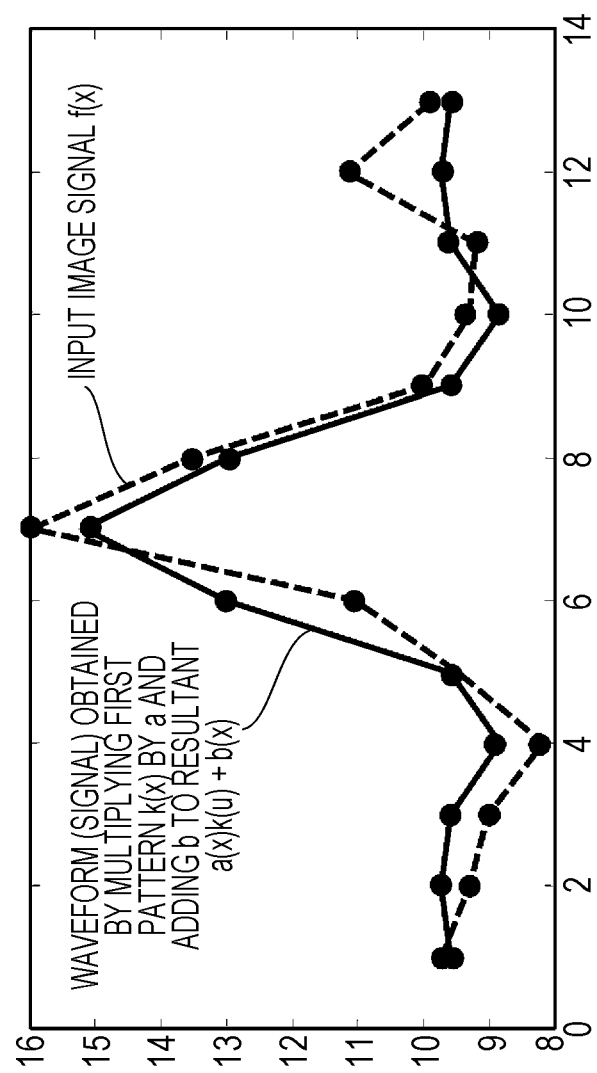
FIG. 3 is a diagram indicating an input image signal Din (=f(x)) and a signal a(x)×k(u)+b(x), which is obtained by multiplying a low-resolution pattern signal PtnL by a and adding b to the resultant signal, in a local region u.

FIG. 3 is a diagram indicating the input image signal Din (=f(x)) and a signal a(x)×k(u)+b(x), which is obtained by multiplying the low-resolution pattern signal PtnL by a and adding b to the resultant, in the local region u.

Note that, when it is set here that the input image signal Din is f(x), the low-resolution pattern signal PtnL is k(u), and a square error of the input image signal Din (=f(x)) and the signal a(x)×k(u)+b(x), which is obtained by multiplying the low-resolution pattern signal PtnL by a and adding b to the resultant, in the local region u is E, the amplitude estimation unit 1 obtains the amplitude a(x) and an offset b(x) with which a value provided by $$E = \sum_{u}^{N} (a(x)k(u) + b(x) - f(x+u))^2$$ [Expression 1]

becomes the minimum. Note that, the amplitude a(x) is a real number and allowed to be a negative value. Moreover, a sign of sigma in the formula above means that a sigma operation (addition processing) is performed for N sample points in the local region u (the same applies hereinafter).

The amplitude estimation unit 1 calculates the amplitude a(x) and the offset b(x), with which the square error E by the formula above becomes the minimum, by a least squares method. Specifically, by $$a(x) = A_1 S_{fk}(x) + A_2 S_f(x)$$

$$b(x) = B_1 S_{fk}(x) + B_2 S_f(x),$$ [Expression 2]

the amplitude estimation unit 1 calculates the amplitude a(x) and the offset b(x) with which the square error E becomes the minimum.

Note that, the formulas above are calculated based on $$S_k = \sum_{u}^{N} k(u)$$ [Expression 3]

$$S_{k2} = \sum_{u}^{N} k(u)^2$$

$$S_{fk}(x) = \sum_{u}^{N} f(x+u) k(u)$$

$$S_f(x) = \sum_{u}^{N} f(x+u)$$

$$A1 = \frac{N}{NS_{k2} - S_k^2}$$

$$A2 = \frac{-S_k}{NS_{k2} - S_k^2}$$

$$B1 = \frac{-S_k}{NS_{k2} - S_k^2}$$

$$B2 = \frac{S_{k2}}{NS_{k2} - S_k^2}.$$

Note that, as can be seen from the formulas above, when the low-resolution pattern signal k(u) is determined, $S_k$, $S_{k2}$, A1, A2, B1, and B2 become constants, and therefore it is preferable to set the low-resolution pattern signal k(u) in advance.

Figure 4:
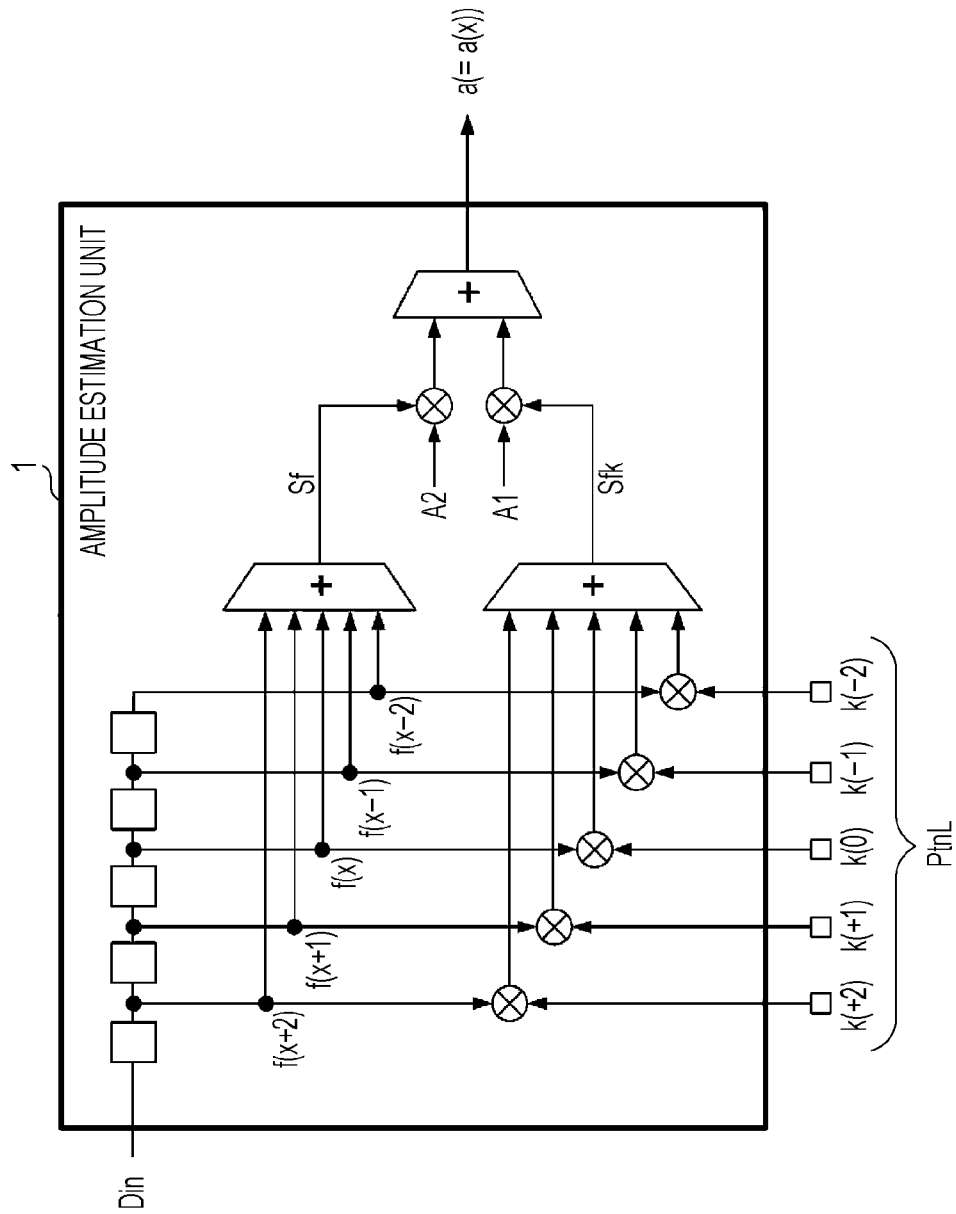
FIG. 4 is a schematic configuration diagram of an amplitude estimation unit 1 of the first embodiment.

Note that, the aforementioned calculation processing may be executed by hardware processing with a configuration illustrated in FIG. 4, for example. In addition, parts each of which is indicated with a square in FIG. 4 are delay units (for example, D flip-flops, delay units (line memories) for one line, or the like). In the case of FIG. 4, the local region u is a region including five (N=5) sample points with a pixel to be processed (target pixel) f(x) as the center thereof, and the amplitude estimation unit 1 executes the aforementioned processing and calculates the amplitude a (a(x)) in this local region.

The amplitude a (=a(x)) calculated in the amplitude estimation unit 1 in this manner is output to the multiplier 3 from the amplitude estimation unit 1.

(1.2.2: Similarity Calculation Processing)

In the similarity calculation unit 2 in the image processing unit 100, similarity calculation processing is executed with respect to the input image signal Din by using the low-resolution pattern signal PtnL.

In a case where the square error E of the input image Din (=f(x)) and the signal a(x)×k(u)+b(x), which is obtained by multiplying the low-resolution pattern signal PtnL by a and adding b to the resultant, becomes the minimum in the local region, the similarity calculation unit 2 outputs the similarity s (=s(x)) as "1", and in the other cases, the similarity calculation unit 2 outputs the similarity s (=s(x)) as "0".

That is, the similarity calculation unit 2 calculates the amplitude a(x) and the offset b(x) with which the square error E becomes the minimum. In the case of setting the calculated values as the amplitude a(x) and the offset value b(x), the similarity calculation unit 2 then (1) outputs the similarity s (=s(x)) as "1" when the square error E becomes the minimum in the local region, and (2) outputs the similarity s (=s(x)) as "0" when it is not the minimum in the local region.

Specifically, the similarity calculation unit 2 (1) outputs the similarity s (=s(x)) as "1" in a case where a minimum square error Emin calculated with following expressions becomes the minimum value in the local region, and (2) outputs the similarity s (=s(x)) as "0" in a case where it does not become the minimum value in the local region.

$$E_{min} = -a(x) S_{fk}(x) - b(x) S_f(x) + S_{f2}(x)$$ [Expression 4]

$$S_{f2}(x) = \sum_{u}^{N} f(x+u)^2$$

Herein, the aforementioned minimum square error Emin will be described here.

The square error E of the input image Din (=f(x)) and the signal a(x)×k(u)+b(x), which is obtained by multiplying the low-resolution pattern signal PtnL by a and adding b to the resultant, is able to be expanded as follows.

$$E = \sum_{u}^{N} (a(x)k(u) + b(x) - f(x+u))^2$$ [Expression 5]

-continued $$= a(x)\sum_{u}^{N}(a(x)k(u)+b(x)-f(x+u))k(u) +$$

$$b(x)\sum_{u}^{N}(a(x)k(u)+b(x)-f(x+u)) -$$

$$\sum_{u}^{N}(a(x)k(u)+b(x)-f(x+u))f(x+u)$$

An extreme value condition of the aforementioned case where the square error E becomes the minimum value is that a partial differential value with respect to a of the square error E is "0" and a partial differential value with respect to b of the square error E is "0". That is, the extreme value condition of the aforementioned case where the square error E becomes the minimum value is as follows.

$$\frac{\partial E}{\partial a} = 2\sum_{u}^{N}(a(x)k(u)+b(x)-f(x+u))k(u) = 0 \quad \text{[Expression 6]}$$

$$\frac{\partial E}{\partial b} = 2\sum_{x}^{N}(a(x)k(u)+b(x)-f(x+u)) = 0 \quad \text{[Expression 7]}$$

By (Expression 5) to (Expression 7) above, $$E_{min} = -\sum_{u}^{N}(a(x)k(u)+b(x)-f(x+u))f(x+u) \quad \text{[Expression 8]}$$

$$= -a(x)S_{fk}(x) - b(x)S_f(x) + S_{f^2}(x)$$

is provided.

Thus, the similarity calculation unit 2 (1) outputs the similarity s (=s(x)) as "1" in the case where the minimum square error Emin calculated with (Expression 4) becomes the minimum value in the local region, and (2) outputs the similarity s (=s(x)) as "0" in a case where it does not become the minimum value in the local region.

Figure 5:
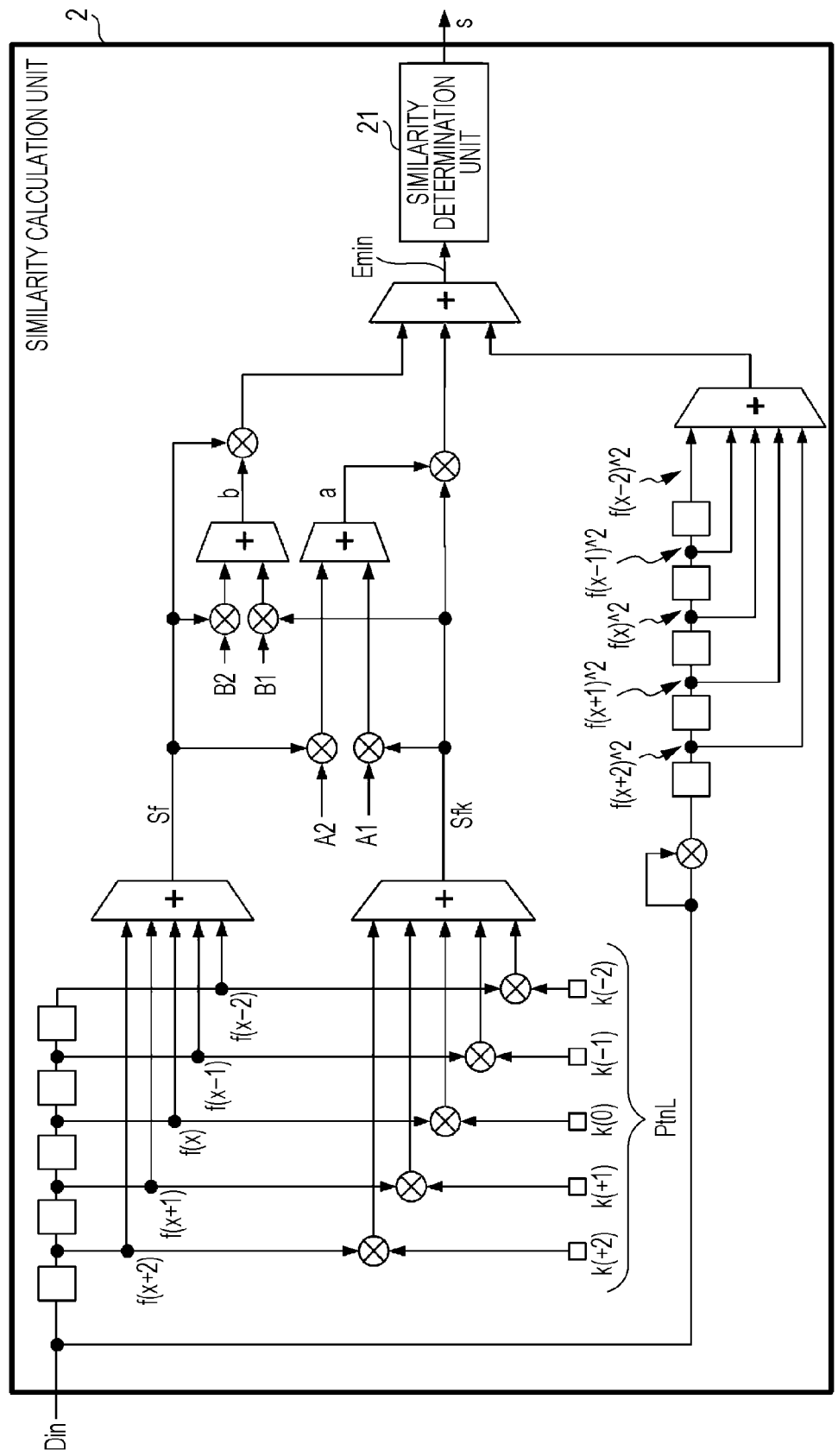
FIG. 5 is a schematic configuration diagram of a similarity calculation unit 2 of the first embodiment.
Figure 6:
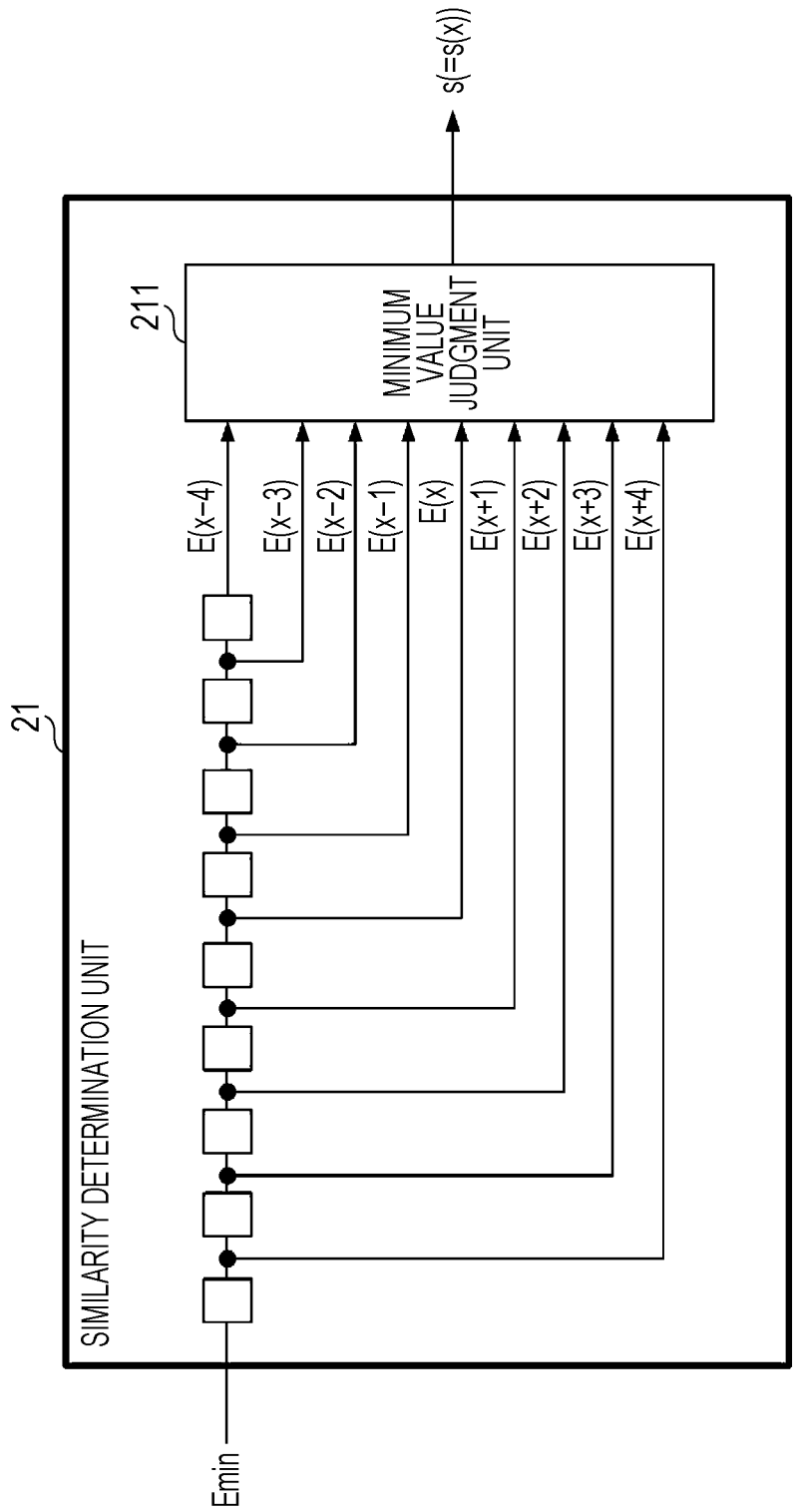
FIG. 6 is a schematic configuration diagram of a similarity determination unit 21 of the first embodiment.

Note that, the aforementioned calculation processing may be executed by hardware processing with a configuration illustrated in FIG. 5 and FIG. 6, for example. In the case of FIG. 5 and FIG. 6, the local region u for calculating the amplitude a(x) and the offset value b(x) is a region including five (N=5) sample points with a pixel to be processed (target pixel) f(x) as the center thereof, and a local region u' for calculating (determining) the minimum square error Emin is a region including nine (N=5) sample points with the minimum square error Emin(x) of the pixel to be processed (target pixel) as the center thereof. A minimum value judgment unit 211 in a similarity determination unit 21 illustrated in FIG. 6 judges at the nine sample points of E(x−4) to E(x+4) whether or not the minimum square error E(x) of the pixel to be processed (target pixel) is the minimum value. Then, the minimum value judgment unit 211 in the similarity determination unit 21 outputs the similarity s (=s(x)) as "1" in a case where E(x) is the minimum value, and, on the other hand, outputs the similarity s (=s(x)) as "0" in a case where E(x) is not the minimum value.

Figure 7:
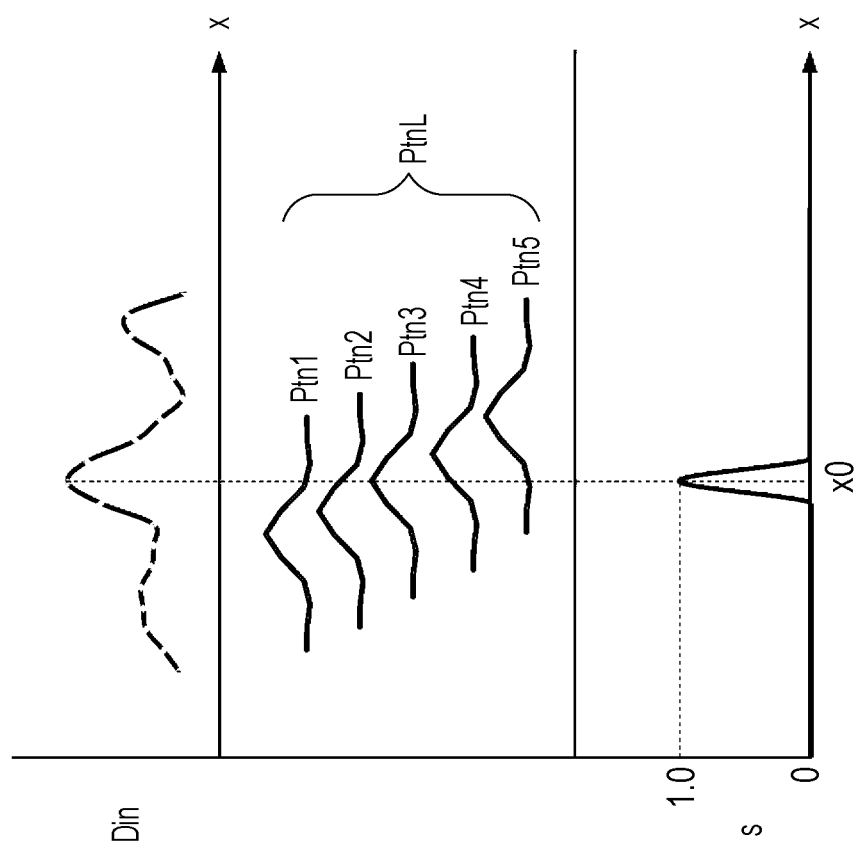
FIG. 7 is a diagram illustrating a signal waveform of an input image signal Din and a signal waveform of a similarity s.

For example, in a case where similarity calculation processing is executed with respect to the input image signal Din illustrated in FIG. 7, as illustrated in FIG. 7, a similarity is verified by using the low-resolution pattern signal PtnL (for example, Ptn1 to Ptn5 illustrated in FIG. 7). In the case of FIG. 7, since a similarity between the low-resolution pattern signal PtnL of Ptn3 which has a peak thereof when x=x0 and the input image signal Din is high, the minimum square error Emin becomes the minimum value (relative minimum) when x=x0. Accordingly, as illustrated in FIG. 7, S=1 is provided when x=x0, and S=0 is provided in the other parts.

Figure 8:
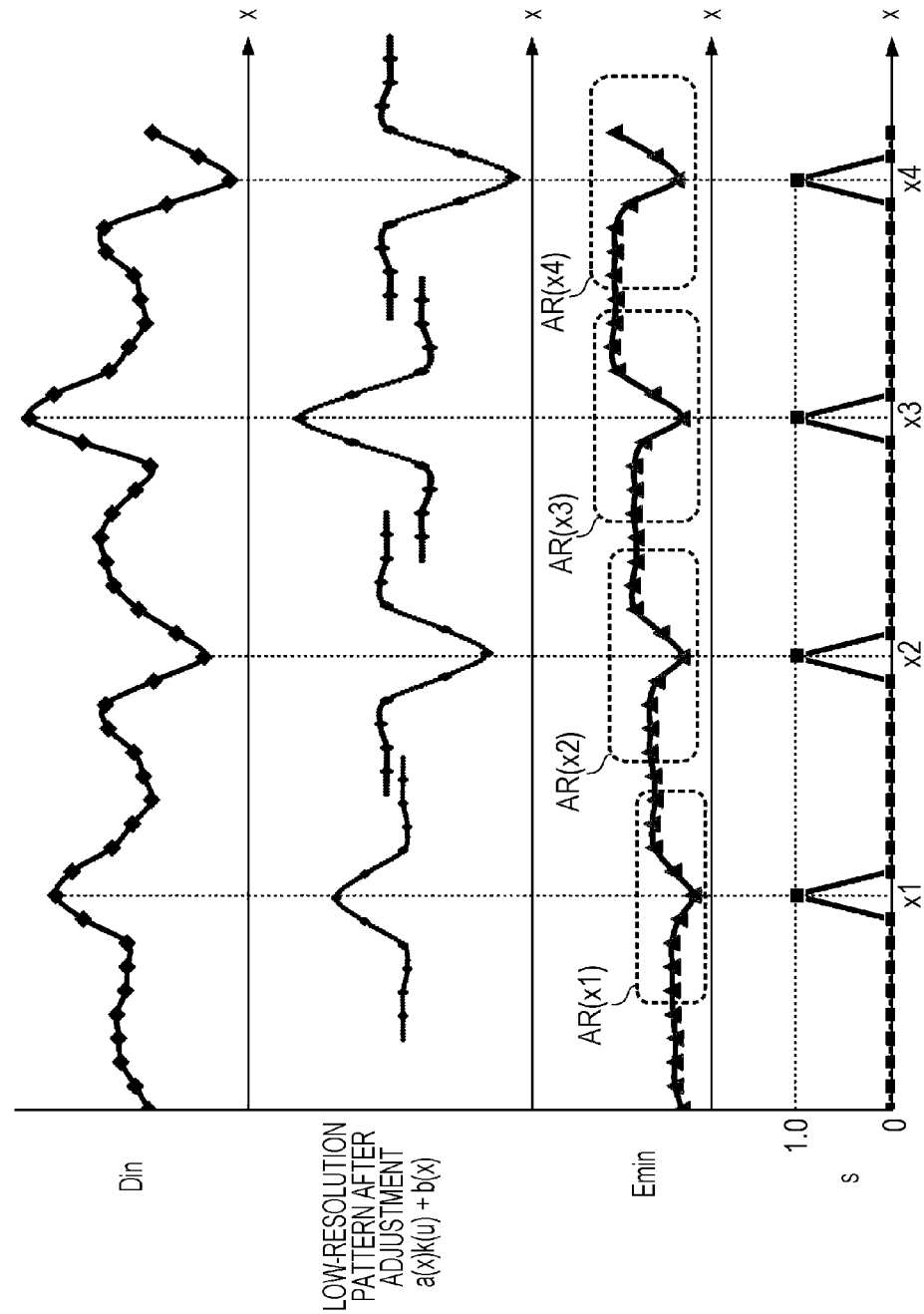
FIG. 8 is a diagram illustrating (1) a signal waveform of the input image Din, (2) a signal waveform of a signal a(x)k(u)+b(x) where an amplitude value a (=a(x)) and an offset value b (=b(x)) are determined by a least squares method (signal obtained by setting an amplitude of a low-resolution pattern signal as a(x) and adding the offset value thereto), (3) a signal waveform of the minimum square error Emin(x), and (4) a signal waveform of the similarity s (=s(x)).

FIG. 8 illustrates (1) a signal waveform of the input image Din, (2) a signal waveform of a signal a(x)k(u)+b(x) with the amplitude value a (=a(x)) and the offset value b (=b(x)) which are determined by the least squares method (signal obtained by setting the amplitude of the low-resolution pattern signal as a(x) and adding the offset value thereto), (3) a signal waveform of the minimum square error Emin(x), and (4) a signal waveform of the similarity s (=s(x)), with lateral axes (x-coordinate axes) thereof matched.

Moreover, in FIG. 8, AR(x) indicates a local region with x as the center thereof, and, in the case of FIG. 8, the number of pixels (the number of samples) included in each local region is "9".

As can be seen in FIG. 8, signal waveforms (signal patterns) similar to that of the low-resolution pattern signal PtnL are generated when x=x1, x2, x3, and x4.

That is,
(1) in a local region AR(x1), Emin becomes the minimum value Emin(x1) when x=x1,
(2) in a local region AR(x2), Emin becomes the minimum value Emin(x2) when x=x2,
(3) in a local region AR(x3), Emin becomes the minimum value Emin(x3) when x=x3, and
(4) in a local region AR(x4), Emin becomes the minimum value Emin(x4) when x=x4.

Therefore, as illustrated in FIG. 8, as to S (=S(x)), S=1 is provided when x=x1, x2, x3, and x4, and S=0 is provided at the other x-coordinate positions. Note that, since the amplitude a(x) is the real number and allowed to be a negative value, even in the case of a waveform whose signal values of the low-resolution pattern signal PtnL (corresponding to k(u)) are inverted, S=1 can be provided.

The similarity s (=s(x)) calculated (determined) in the similarity calculation unit 2 in this manner is output to the multiplier 3 from the similarity calculation unit 2.

In the multiplier 3, the amplitude a (=a(x)) output from the amplitude estimation unit 1 and the similarity s (=s(x)) output from the similarity calculation unit 2 are multiplied. Then, a signal after the multiplication processing (=a×s (=a(x)×s(x))) is output to the FIR filter unit 4.

(1.2.3: FIR Filter Processing)

In the FIR filter unit 4 in the image processing unit 100, by using the difference pattern signal PtnDiff, FIR filter processing is executed with respect to the multiplied signal (a×s) of the amplitude a (=a(x)) and the similarity s (=s(x)), which is output from the multiplier 3.

That is, the FIR filter unit 4 executes FIR filter processing in which a data sequence of the difference pattern signal PtnDiff is set as an FIR filter coefficient. In other words, when it is set that the difference pattern signal PtnDiff is d(x+i) (i: integer, and −n≤i≤n), by executing processing corresponding to $$\Delta D(x) = \sum_{i=-n}^{n}(d(x+i) \cdot s(x+i) \cdot a(x+i)), \quad \text{[Expression 9]}$$

the FIR filter unit 4 acquires a signal ΔD(x) after the FIR filter processing.

Figure 9:
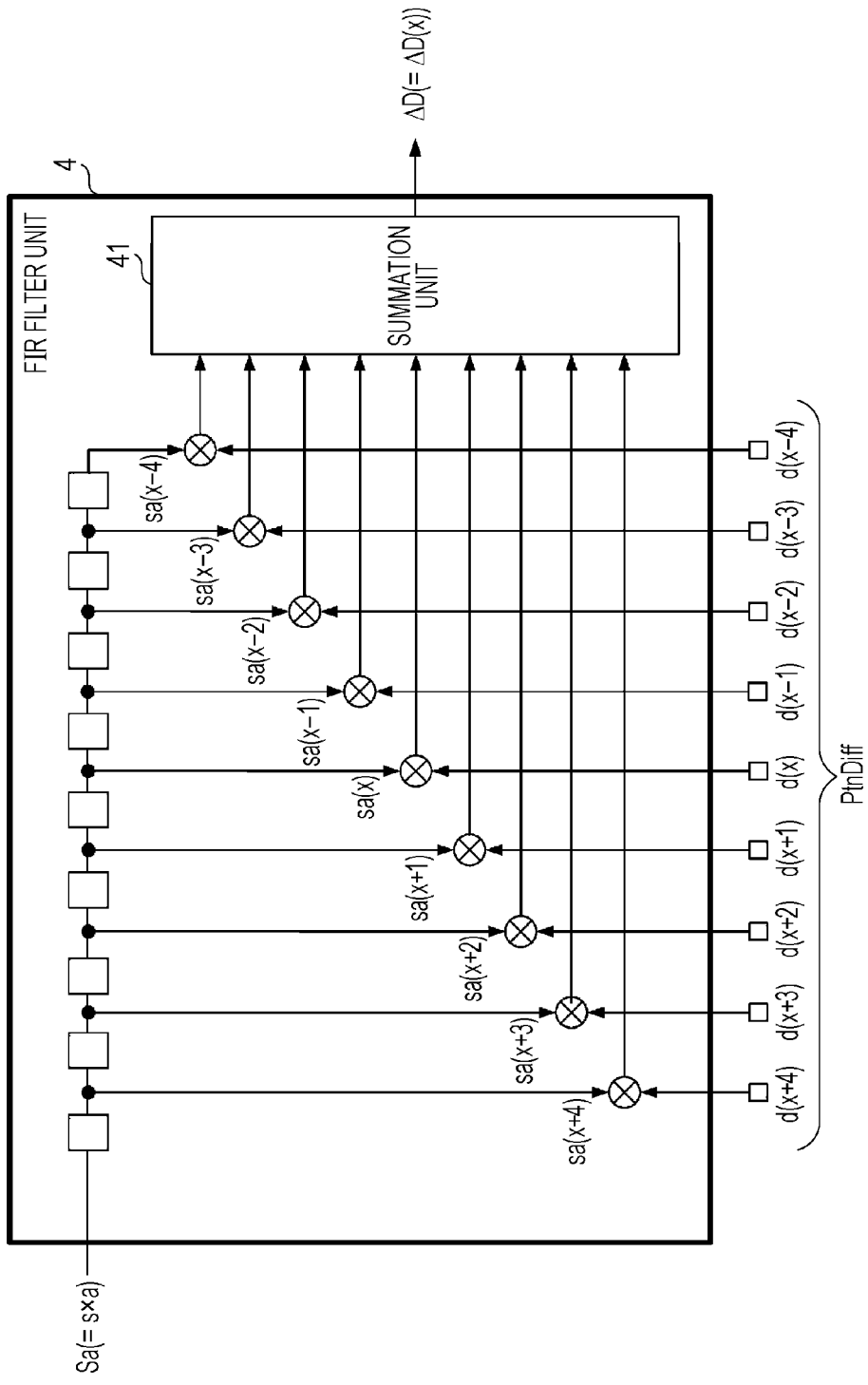
FIG. 9 is a schematic configuration diagram of an FIR filter unit 4 of the first embodiment.

Note that, the aforementioned FIR filter processing may be executed by hardware processing with a configuration illustrated in FIG. 9, for example. In the configuration illustrated in FIG. 9, FIR filter processing in a case where n=4 in the aforementioned expression is executed. Note that, a summation unit 41 in FIG. 9 performs addition (sigma operation) of respective inputs.

The FIR filter processing will be described here by using FIG. 10.

Figure 10:
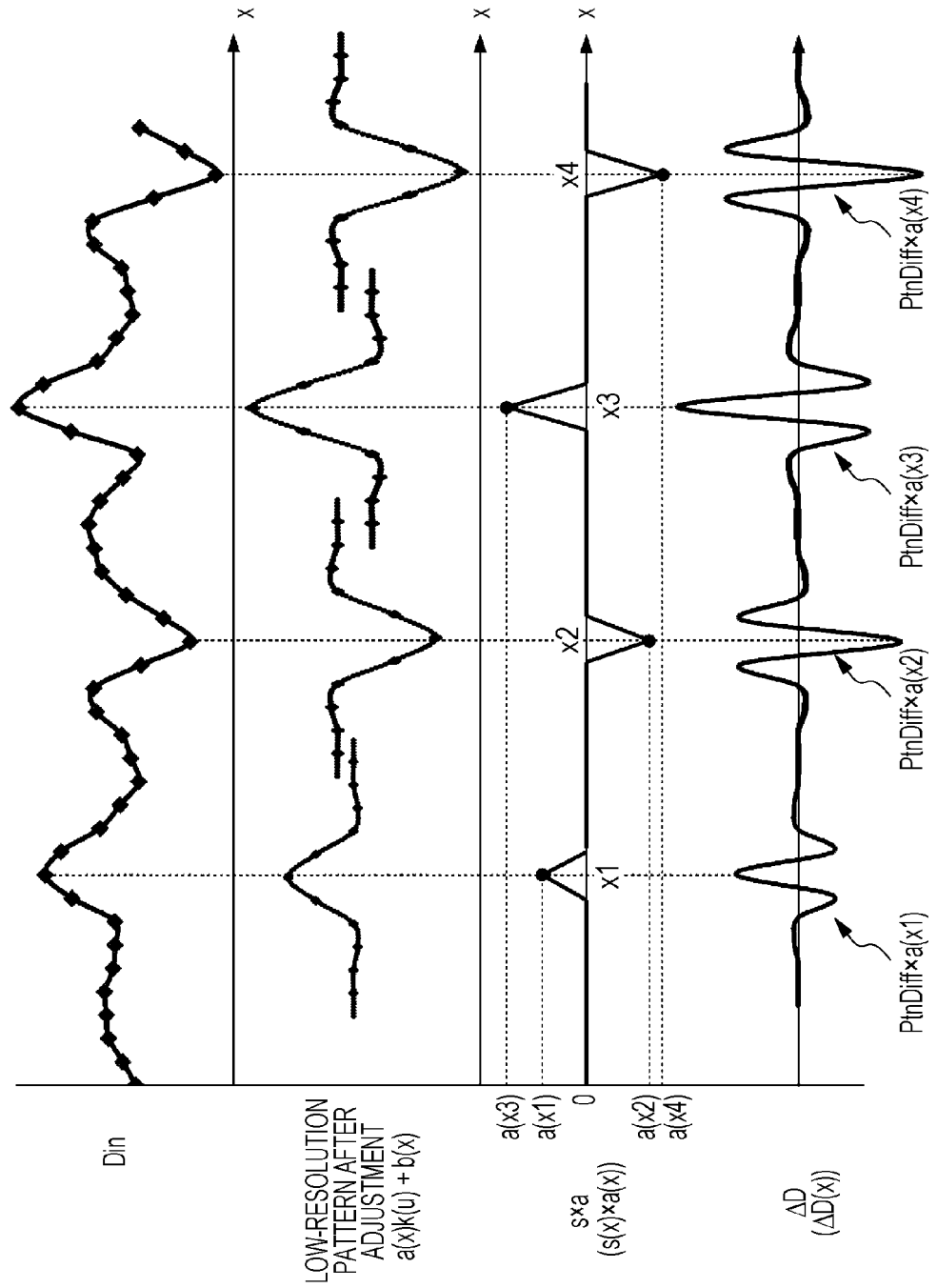
FIG. 10 is a diagram illustrating (1) a signal waveform of the input image Din, (2) a signal waveform of the signal a(x)k(u)+b(x) with the amplitude value a (=a(x)) and the offset value b (=b(x)) which are determined by the least squares method (signal obtained by setting the amplitude of the low-resolution pattern signal as a(x) and adding the offset value thereto), (3) a signal waveform of an output signal s×a (=s(x)×a(x)) from the multiplier 3, and (4) a signal waveform of an output signal ΔD (=ΔD(x)) from the FIR filter unit 4.

FIG. 10 illustrates (1) a signal waveform of the input image Din, (2) a signal waveform of the signal a(x)k(u)+b(x) with the amplitude value a (=a(x)) and the offset value b (=b(x)) which are determined by the least squares method (signal obtained by setting the amplitude of the low-resolution pattern signal as a(x) and adding the offset value thereto), (3) a signal waveform of the output signal s×a (=s(x)×a(x)) from the multiplier 3, and (4) a signal waveform of the output signal ΔD (=ΔD(x)) from the FIR filter unit 4, with lateral axes (x-coordinate axes) thereof matched.

In the aforementioned FIR filter processing, a signal waveform of an impulse response (an output when a signal of amplitude "1" is input only in a case where x=xa) matches the data sequence of the different pattern signal PtnDiff. Accordingly, when a signal having a signal value a(xa), which is not zero, only in the case where x=xa and having a signal value of "0" except for the case where x=xa is input to the FIR filter unit 4, a signal of the difference pattern signal PtnDiff whose signal value is multiplied by a(xa) is output from the FIR filter unit 4.

As illustrated in FIG. 10, in each of cases where x=x1, x2, x3, and x4, the signal output from the FIR filter unit 4 becomes as follows.

(1) Since the output signal of the multiplier 3 satisfies s×a=a(x1) when x=x1, a signal obtained by multiplying the difference pattern signal PtnDiff by a(x1) (difference signal ΔD (=ΔD(x))) is output from the FIR filter unit 4 at this time.
(2) Since the output signal of the multiplier 3 satisfies s×a=a(x2) when x=x2, a signal obtained by multiplying the difference pattern signal PtnDiff by a(x2) (difference signal ΔD (=ΔD(x))) is output from the FIR filter unit 4 at this time.
(3) Since the output signal of the multiplier 3 satisfies s×a=a(x3) when x=x3, a signal obtained by multiplying the difference pattern signal PtnDiff by a(x3) (difference signal ΔD (=ΔD(x))) is output from the FIR filter unit 4 at this time.
(4) Since the output signal of the multiplier 3 satisfies s×a=a(x4) when x=x4, a signal obtained by multiplying the difference pattern signal PtnDiff by a(x4) (difference signal ΔD (=ΔD(x))) is output from the FIR filter unit 4 at this time.

The signal acquired by the FIR filter unit 4 in this manner is output to the adder 5 as the difference signal ΔD (=ΔD(x)).

In the adder 5, the input image signal Din and the difference signal ΔD which is output from the FIR filter unit 4 are added. That is, in the adder 5, processing corresponding to $$Dout=Din+\Delta D$$

is executed, and an output image signal Dout is acquired.

Figure 11:
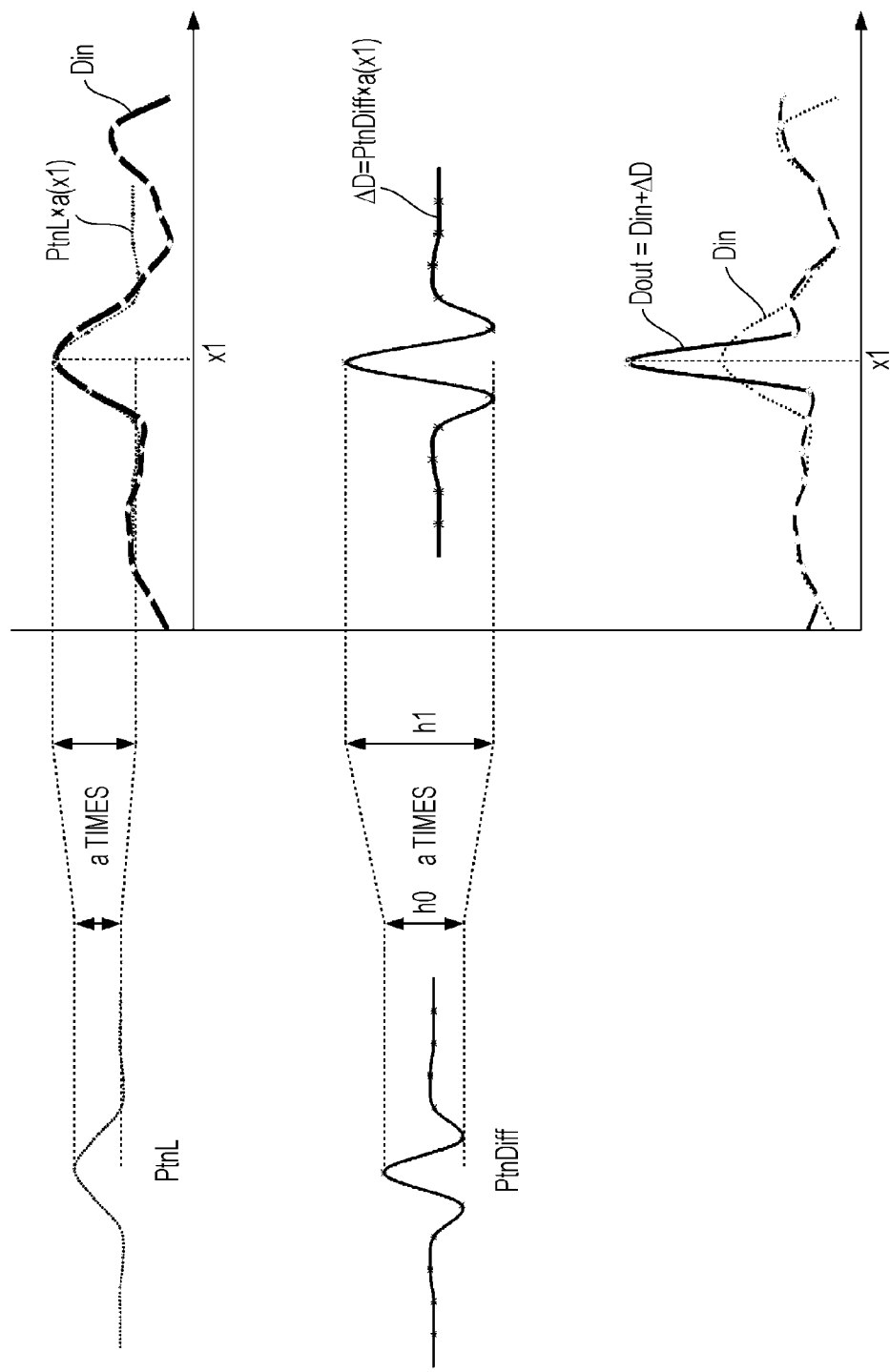
FIG. 11 is a diagram illustrating (1) a signal waveform of the input image Din, (2) a signal waveform of the signal a(x)k(u)+b(x) with the amplitude value a (=a(x)) and the offset value b (=b(x)) which are determined by the least squares method (signal obtained by setting the amplitude of the low-resolution pattern signal as a(x) and adding the offset value thereto), (3) a signal waveform of the output signal ΔD (=ΔD(x)) from the FIR filter unit 4, and (4) a signal waveform of an output signal Dout, all of which are in the vicinity of x=x1 in FIG. 10.

FIG. 11 illustrates (1) a signal waveform of the input image Din, (2) a signal waveform of the signal a(x)k(u)+b(x) with the amplitude value a (=a(x)) and the offset value b (=b(x)) which are determined by the least squares method (signal obtained by setting the amplitude of the low-resolution pattern signal as a(x) and adding the offset value thereto) (signal waveform indicated as "PtnL×a(x1)" in FIG. 10), (3) a signal waveform of the output signal ΔD (=ΔD(x)) from the FIR filter unit 4, and (4) a signal waveform of the output signal Dout, all of which are in the vicinity of x=x1 in FIG. 10, with lateral axes (x-coordinate axes) thereof matched. In addition, the low-resolution pattern signal PtnL and the difference pattern signal PtnDiff are illustrated in the left side in FIG. 11.

As illustrated in FIG. 11, in the image processing system 1000, the magnification a is set by the amplitude estimation unit 1 so that an error between a signal waveform when multiplying the low-resolution pattern signal PtnL by a and adding the offset b to the resultant and the input image signal Din becomes the smallest. Then, in the image processing system 1000, by the similarity calculation unit 2, a position in the local region, at which the minimum square error Emin of the signal waveform when multiplying the low-resolution pattern signal PtnL by a and adding the offset b to the resultant and the input image signal becomes the minimum value (in FIG. 11, a position at which an x-coordinate position is x1) is detected and the similarity at the position is set as "1" (in the case of FIG. 11, S(x1)=1). Thereafter, in the image processing system 1000, when the multiplied signal s×a generated by the multiplier 3 is input to the FIR filter unit 4, the FIR filter unit 4 outputs the signal ΔD obtained by multiplying the signal value of the difference pattern signal PtnDiff by a. In the image processing system 1000, the adder 5 then adds the signal ΔD obtained by multiplying the signal value of the difference pattern signal PtnDiff by a and the input image signal Din. Accordingly, as illustrated in FIG. 11, in the image processing system 1000, it is thereby possible to reproduce an original thin linear image region from a linear image region, which has become thick due to upscaling processing for a low-resolution image, in the vicinity of x=x1.

As described above, in the image processing system 1000, by using the signal waveform obtained by multiplying the low-resolution pattern signal PtnL, which is obtained when the high-resolution pattern signal PtnH is subjected to downscaling processing and further subjected to upscaling processing, by a, a signal waveform part similar to this signal waveform is detected in the input image signal. Then, in the image processing system 1000, the signal waveform obtained by multiplying the difference pattern signal PtnDiff, which is a difference between the high-resolution pattern signal PtnH and the low-resolution pattern signal PtnL, by a is added to a signal waveform part of the input image signal, which is detected as described above. The signal waveform part in the input image signal Din, which is similar to the signal waveform obtained by multiplying the low-resolution pattern signal PtnL by a, is a part whose high frequency component is lost by being subjected to the downscaling processing and further subjected to the upscaling processing, and the lost high frequency component is similar to the signal waveform obtained by multiplying the difference pattern signal PtnDiff by a (signal ΔD).

Thus, in the image processing system 1000, by adding the signal waveform obtained by multiplying the difference pattern signal PtnDiff by a (the magnification a is a magnification with which the difference between the signal waveform obtained by multiplying the low-resolution pattern signal PtnL by a and the input image signal Din becomes the minimum in the local region) (signal ΔD) to the input image signal Din, it is possible to appropriately restore the high frequency component which is lost by being subjected to the downscaling processing and further subjected to the upscaling processing.

In this manner, in the image processing system 1000, the part having the signal waveform similar to a signal processing waveform which is generated when the downscaling processing is performed and the upscaling processing is further performed is detected, and the lost high frequency component of only the detected part is adjusted so that amplitude thereof becomes equivalent to that of a signal of the lost high frequency component, and added to the input image signal. Accordingly, in the image processing system 1000, it is possible to reproduce an original thin linear image region from a linear image region, which has become thick due to upscaling processing for a low-resolution image, without enhancing a noise component unnecessarily or causing overshoot excessively as in the conventional technique. As a result thereof, an image signal (video signal) acquired by the image processing system 1000 becomes an image signal (video signal) having excellent definition and a high quality.

First Modified Example

Next, a first modified example of the first embodiment will be described.

Note that, the same reference signs are assigned to parts similar to those of the aforementioned embodiment, and detailed description thereof will be omitted.

An image processing system of the present modified example has a configuration similar to that of the image processing system 1000 of the first embodiment, and is different only in processing executed in the amplitude estimation unit 1.

Figure 12:
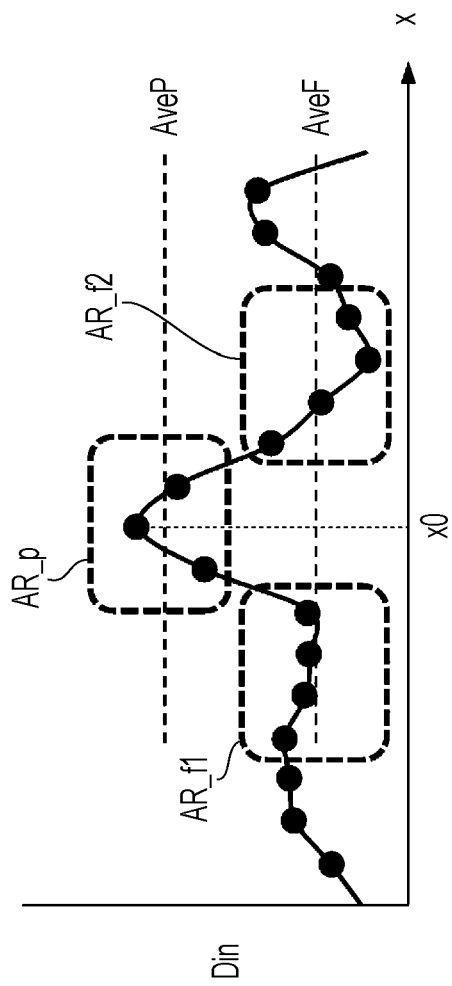
FIG. 12 is a diagram for explaining processing of the amplitude estimation unit 1 in a first modified example of the first embodiment.

FIG. 12 is a diagram for explaining the processing of the amplitude estimation unit 1 in the present modified example.

In the amplitude estimation unit 1 of the present modified example, the amplitude a is not obtained by the least squares method as the first embodiment, and the amplitude a is obtained simply.

Specifically, when a pixel to be processed is set as a pixel of x=x0 as illustrated in FIG. 12, the amplitude estimation unit 1 sets a region AR_p and regions AR_f1 and AR_f2 which are in the front and the back of the region AR_p on an x axis as illustrated in FIG. 12. The amplitude a (=a(x)) is obtained based on an average value AveP of pixel values (signal values) of pixels included in the region AR_p and an average value AveF of pixel values (signal values) of pixels included in the regions AR_f1 and AR_f2, which are illustrated in FIG. 12. That is, by $$AveP = \frac{1}{2n+1} \sum_{i=-n}^{n} f(x0+i) \text{ and}$$ [Expression 10]

$$AveF = \frac{1}{m-n} \sum_{i=-m}^{-n-1} f(x0+i) + \frac{1}{m-n} \sum_{i=n+1}^{m} f(x0+i),$$ [Expression 11]

the amplitude estimation unit 1 calculates the average value AveP of the pixel values (signal values) of the pixels included in the region AR_p and the average value AveF of the pixel values (signal values) of the pixels included in the regions AR_f1 and AR_f2.

Note that, n is the number of samples in the front and the back of the center of the region AR_p, and m is the number of samples in the front and the back of the center of a region formed by the region AR_p, the region AR_f1, and the region AR_f2. FIG. 12 illustrates a case where n=1 and m=5.

In addition, when it is set that amplitude of the low-resolution pattern signal PtnL is a0, by $$a(x0)=(AveP-AveF)/a0,$$

the amplitude a(x) (=a(x0)) in the pixel to be processed of x=x0 is calculated.

In the present modified example, it is thereby possible to simply calculate the magnification a (=a(x)) without performing the calculation processing by the least squares method as the first embodiment.

Second Modified Example

Next, a second modified example of the first embodiment will be described.

Note that, the same reference signs are assigned to parts similar to those of the aforementioned embodiment (including the modified example), and detailed description thereof will be omitted.

In an image processing system of the present modified example, there is a difference in a processing content of the similarity determination unit 21 of the similarity calculation unit 2 of the image processing system 1000 in the first embodiment.

Figure 13:
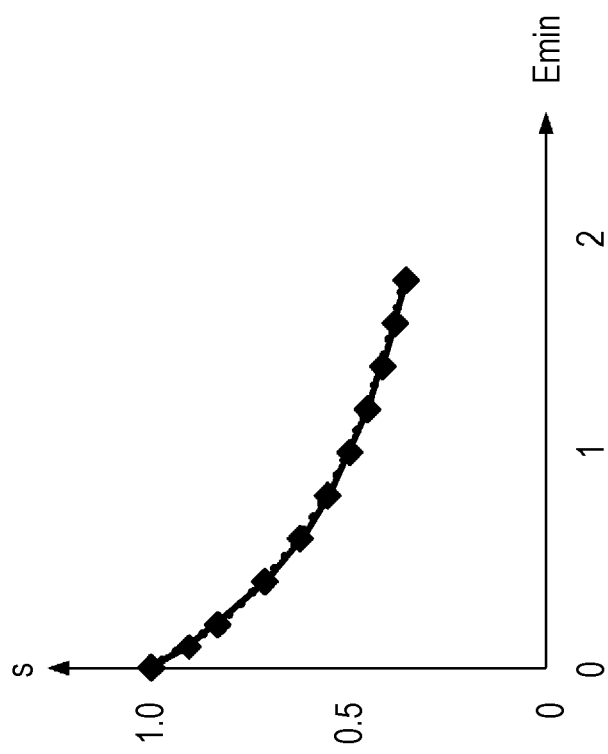
FIG. 13 is a diagram illustrating input/output characteristics of a similarity determination unit in the first modified example of the first embodiment.

The similarity determination unit 21 of the first embodiment has the configuration illustrated in FIG. 6, and judges whether or not a pixel to be processed has the minimum value of Emin in the local region. On the other hand, the similarity determination unit 21 of the present modified example is composed of a ROM, which has input/output characteristics as illustrated in FIG. 13, or the like instead of the configuration illustrated in FIG. 6. That is, in the similarity determination unit 21 of the present modified example, an output value, i.e. a similarity becomes great by being close to "1" as a value of the minimum square error Emin, which is to be input, becomes close to "0", as illustrated in FIG. 13.

Accordingly, the similarity s having an intermediate value between 0 and 1 is output from the similarity calculation unit 2.

That is, in the image processing system of the present modified example, it is possible to perform processing by using the similarity s having the intermediate value between 0 and 1.

Note that, the input/output characteristics of the similarity determination unit 21 of the present modified example are not limited to the above, and may be other characteristics as long as being characteristics monotonously decreasing with respect to the value of the minimum square error Emin as an input. Further, the similarity determination unit 21 of the present modified example may be realized by a ROM or the like, and the aforementioned input/output characteristics may be realized by an operation.

Third Modified Example

Next, a third modified example of the first embodiment will be described.

Note that, the same reference signs are assigned to parts similar to those of the aforementioned embodiment (including the modified examples), and detailed description thereof will be omitted.

Figure 14:
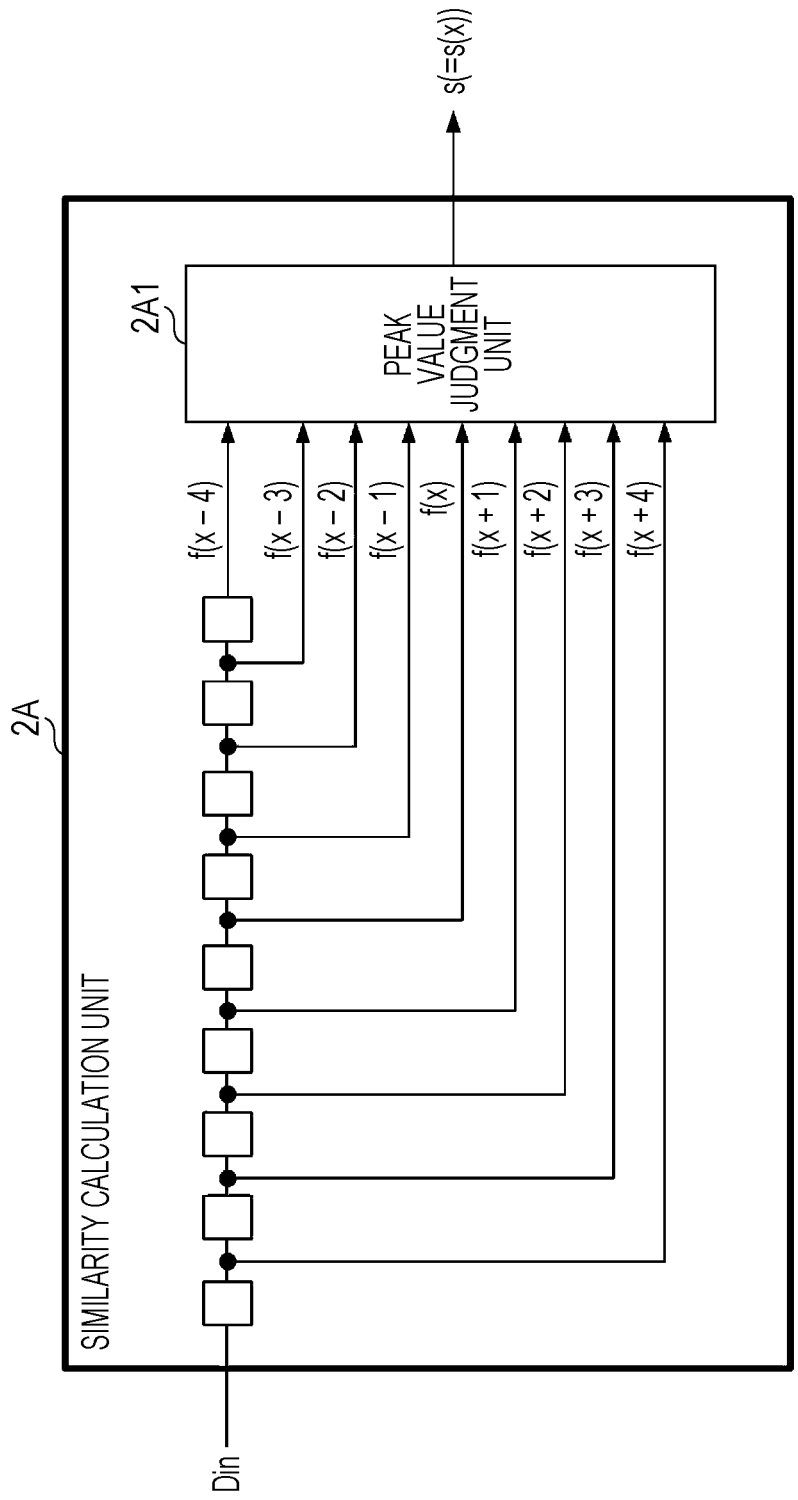
FIG. 14 is a schematic configuration diagram of a similarity calculation unit 2A in a third modified example of the first embodiment.

An image processing system of the present modified example has a configuration obtained by substituting a similarity calculation unit 2A illustrated in FIG. 14 for the similarity calculation unit 2 in the image processing system 1000 of the first embodiment. Aside from the above, the image processing system of the present modified example is similar to the image processing system 1000 of the first embodiment.

The similarity calculation unit 2A of the present modified example outputs the similarity s as the similarity s=1 in a case where a pixel to be processed has a peak value (the maximum value or the minimum value) in a local region of the input image Din (in the case of FIG. 14, a local region composed of nine pixels), and outputs the similarity s as the similarity s=0 in the other cases.

Figure 15:
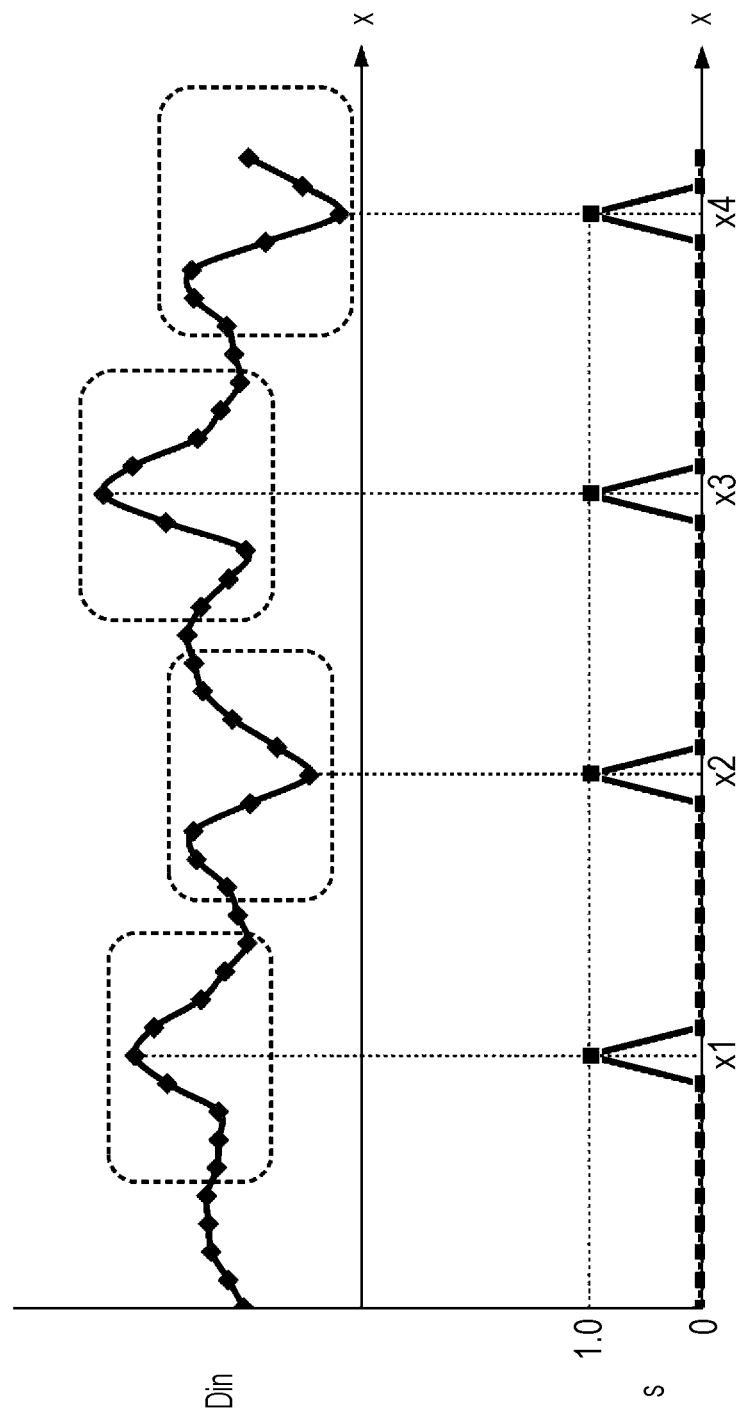
FIG. 15 is a diagram illustrating a signal waveform of the input image Din and the similarity s which is acquired by the similarity calculation unit 2A of the present modified example.

FIG. 15 illustrates a signal waveform of the input image Din and the similarity s, which is acquired by the similarity calculation unit 2A of the present modified example, with x axes thereof matched.

As can be seen in FIG. 15, the similarity s is appropriately calculated (determined) by the similarity calculation unit 2A of the present modified example. Note that, in the case of FIG. 15, a local region is a local region composed of nine pixels (sample points).

As described above, it is possible to simply calculate the similarity s in the image processing system of the present modified example.

Fourth Modified Example

Next, a fourth modified example of the first embodiment will be described.

Note that, the same reference signs are assigned to parts similar to those of the aforementioned embodiment (including the modified examples), and detailed description thereof will be omitted.

Figure 16:
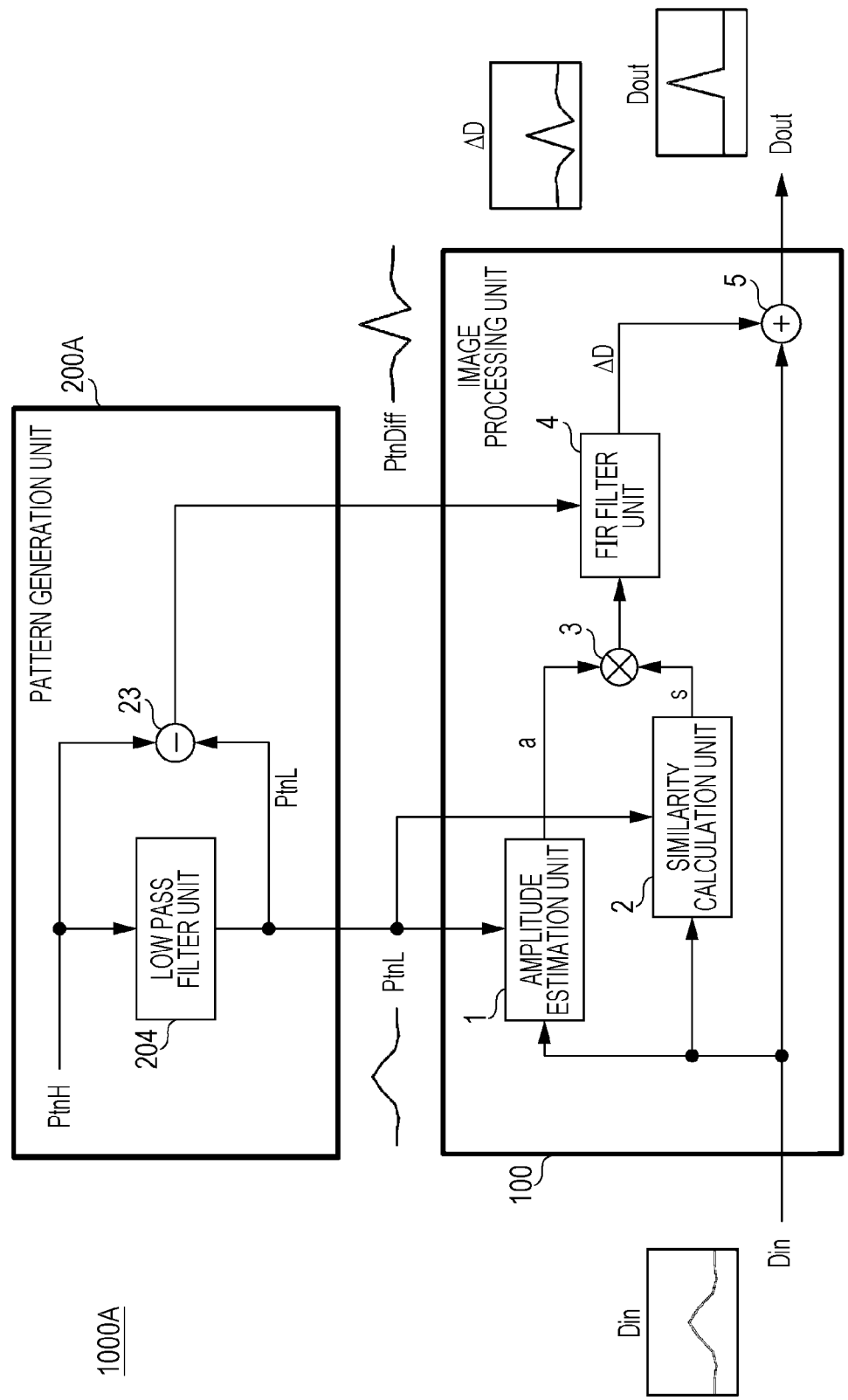
FIG. 16 is a schematic configuration diagram of an image processing system 1000A according to a fourth modified example of the first embodiment.
Figure 17:
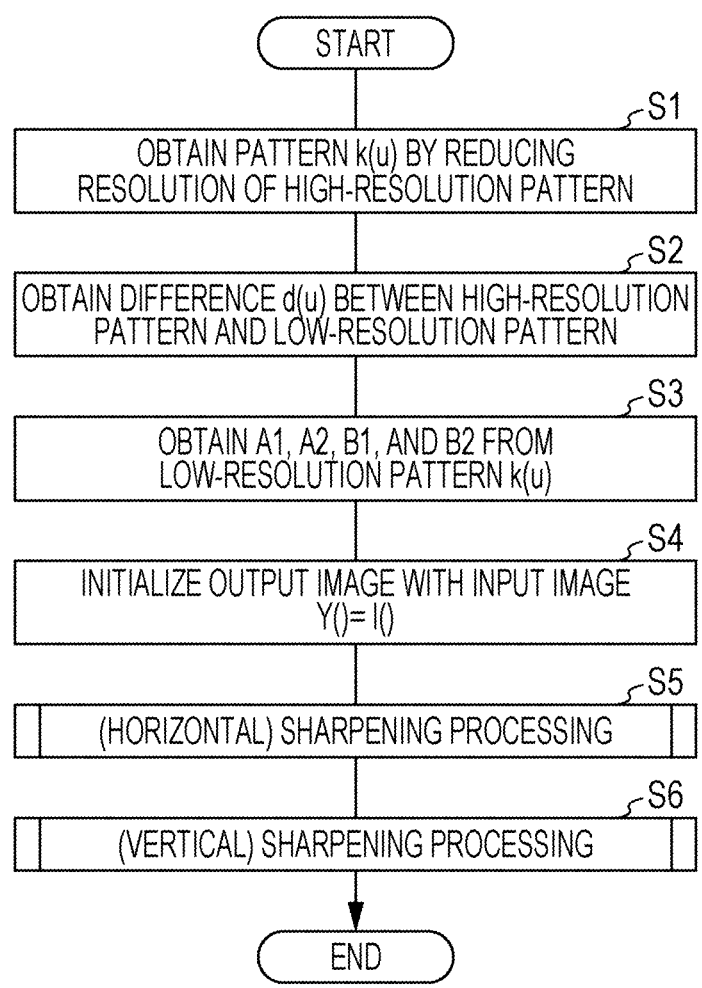
FIG. 17 is a flowchart of an image processing method of a second embodiment.

FIG. 16 illustrates a schematic configuration diagram of an image processing system 1000A of the fourth modified example of the first embodiment.

The image processing system 1000A of the present modified example has a configuration obtained by substituting a pattern generation unit 200A for the pattern generation unit 200 of the image processing system 1000 of the first embodiment. Specifically, as illustrated in FIG. 16, the image processing system 1000A of the present modified example has the configuration obtained by substituting a low pass filter unit 204 for the downscaling processing unit 201 and the upscaling processing unit 202 in the pattern generation unit 200 of the first embodiment. Aside from the above, the image processing system 1000A of the present modified example is similar to the image processing system 1000 of the first embodiment.

The low pass filter unit 204 receives the high-resolution pattern signal PtnH and executes low pass filter processing with respect to the input high-resolution pattern signal PtnH. The low pass filter unit 204 then outputs the signal after the low pass filter processing to the subtractor 23 and the amplitude estimation unit 1 as the low-resolution pattern signal PtnL.

Note that, for the "low pass filter processing", it is preferable to set a cutoff frequency of the low pass filter processing so that a signal waveform which is acquired when the low pass filter processing is executed for the high-resolution pattern signal PtnH and a signal waveform which is acquired in the case of performing downscaling processing and then performing upscaling processing with respect to the high-resolution pattern signal PtnH are similar to each other (for example, so that a difference (error) between the two (two signal waveforms) falls within a predetermined range).

In the image processing system 1000 of the first embodiment, the low-resolution pattern signal PtnL which is acquired when the high-resolution pattern signal PtnH is subjected to downscaling processing by the downscaling processing unit 201 and thereafter subjected to upscaling processing by the upscaling processing unit 202 is a signal obtained by reducing a high frequency component of the high-resolution pattern signal PtnH. That is, this signal approximates a signal acquired by executing low pass filter processing with respect to the high-resolution pattern signal PtnH.

In the image processing system 1000A of the present modified example, as described above, the low-resolution pattern signal PtnL is acquired by executing low pass filter processing by the low pass filter unit 204 with respect to the high-resolution pattern signal PtnH. Thus, the low-resolution pattern signal PtnL acquired in the image processing system 1000A of the present modified example approximates the low-resolution pattern signal PtnL acquired in the image processing system 1000 of the first embodiment. As a result thereof, in the image processing system 1000A, it is possible to realize processing similar to that of the first embodiment by performing processing by using the low-resolution pattern signal PtnL acquired by the pattern generation unit 200A.

In addition, in the image processing system 1000A of the present modified example, since it is possible to acquire the low-resolution pattern signal PtnL only by performing low pass filter processing by the low pass filter unit 204 as described above, it is possible to reduce an operation amount compared to the first embodiment.

For example, in the case of realizing an image processing system, when there is a margin in a computer resource, the configuration of the image processing system 1000 of the first embodiment may be adopted. In this case, the highly accurate low-resolution pattern signal PtnL is acquired by executing downscaling processing by the downscaling processing unit 201 and upscaling processing by the upscaling processing unit 202 with respect to the high-resolution pattern signal PtnH. This is because it is possible to generate a model by reproducing also a part of aliasing slightly generated due to decimation processing.

On the other hand, when there is no margin in the computer resource, the configuration of the image processing system 1000A of the present modified example may be adopted. In this case, since it is possible to acquire the low-resolution pattern signal PtnL only by performing low pass filter processing by the low pass filter unit 204 with respect to the high-resolution pattern signal PtnH, it is possible to reduce an operation amount and reduce a required computer resource.

Second Embodiment

Next, a second embodiment will be described.

Note that, the same reference signs are assigned to parts similar to those of the aforementioned embodiment (including the modified examples).

FIG. 17 to FIG. 20 are flowcharts of an image processing method according to the second embodiment.

The image processing method of the present embodiment will be described by using the flowcharts of FIG. 17 to FIG. 20.

Note that, a resolution estimation method of the present embodiment is executed by, for example, the image processing system of the first embodiment or a system including a control unit (a CPU, or the like), an image memory, a ROM, a RAM, and the like.

(S1):

At step S1, a pattern (low-resolution pattern) k(u) obtained by reducing resolution of a high-resolution pattern is set (calculated).

(S2):

At step S2, a difference pattern d(u) which is a difference between the high-resolution pattern and the low-resolution pattern is set (calculated).

(S3):

At step S3, similarly to what has been described with (Expression 3) of the first embodiment, A1, A2, B1, and B2 are calculated from the low-resolution pattern k(u). Note that, N in (Expression 3) indicates the number of samples included in a local region. In addition, it is set that $N=2 \times n+1$, and n is a value indicating a range of the local region with a pixel position x of a pixel to be processed (target pixel) as the center thereof. That is, the local region is expressed with (x−n) to (x+n).

(S4):

At step S4, an output image Y(i,j) is initialized with an input image I(i,j).

(S5 and S6):

At step S5, sharpening processing in a horizontal direction of an image (horizontal sharpening processing) is executed. By adding a high frequency component $\Delta Y$ acquired by the horizontal sharpening processing to the image Y(i,j), the horizontal sharpening processing is executed.

At step S6, sharpening processing in a vertical direction of the image (vertical sharpening processing) is executed. By adding the high frequency component $\Delta Y$ acquired by the vertical sharpening processing to the image Y(i,j), the vertical sharpening processing is executed.

Note that, an order of steps S5 and S6 may be switched.

<<Sharpening Processing>>

Figure 18:
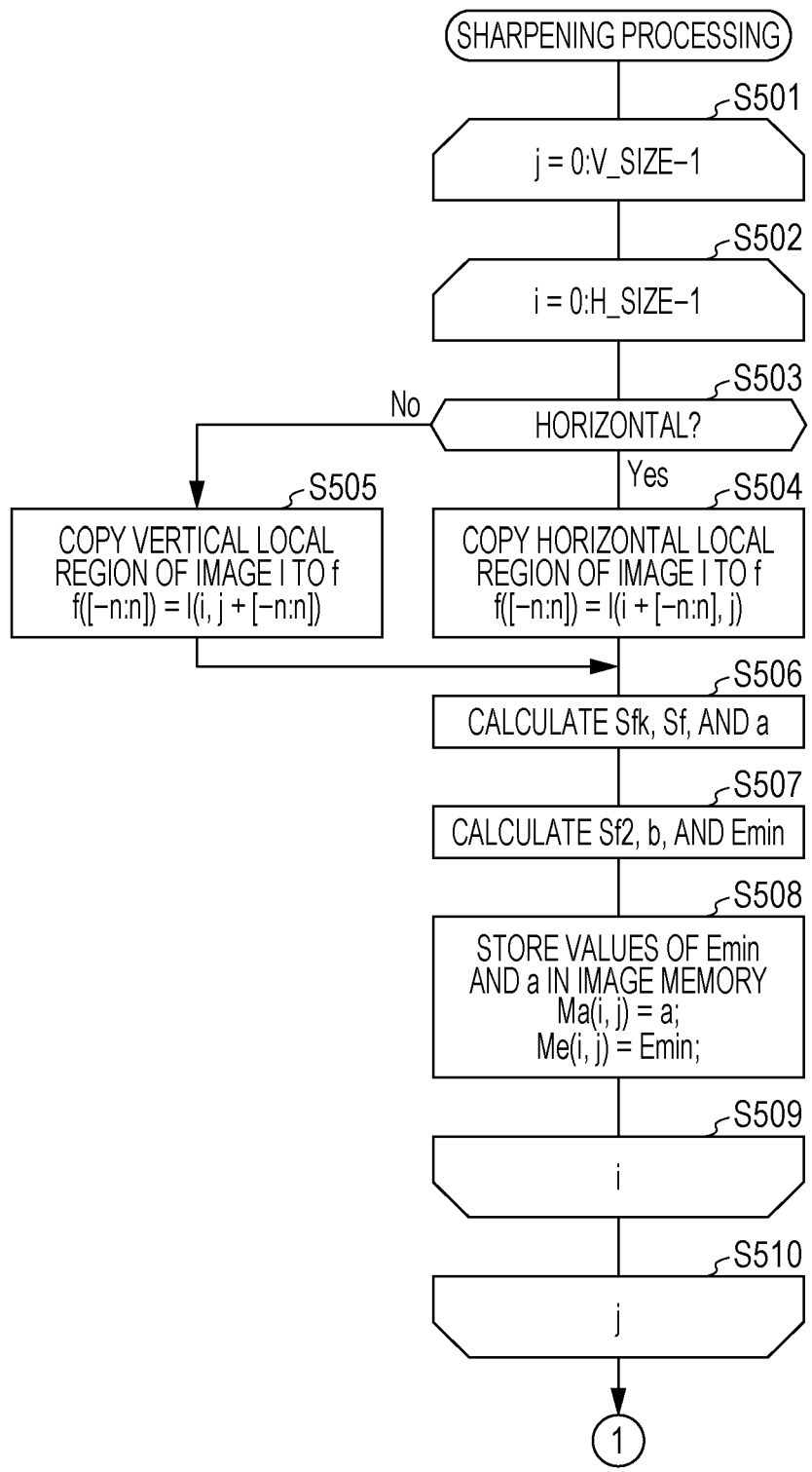
FIG. 18 is a flowchart of the image processing method of the second embodiment.

Next, details of the sharpening processing (the horizontal sharpening processing and the vertical sharpening processing) of steps S5 and S6 will be described by using FIG. 18 to FIG. 20.

(S501 and S502):

At step S501, by setting that j=0, processing is iterated while incrementing j by +1, until j becomes V_SIZE−1. Note that, V_SIZE denotes a vertical image size, and j denotes a vertical coordinate position of the pixel to be processed.

At step S502, by setting that i=0, processing is iterated while incrementing i by +1, until i becomes H_SIZE−1. Note that, H_SIZE denotes a horizontal image size, and i denotes a horizontal coordinate position of the pixel to be processed.

Unless otherwise specified, i and j indicate the aforementioned meanings in the flowcharts below.

(S504 and S505):

At step S504, information of the local region is copied to f(−n:n) (for example, f(−n:n) is a memory region capable of saving data of −n to n (2n+1 pieces of data) therein). In the case of the horizontal processing, pixels adjacent in the horizontal direction with a pixel (i,j) as the center are copied to f(−n:n). This processing is expressed as $$f([-n:n])=I(i,j+[-n:n]).$$

Moreover, in the case of the vertical processing at step S505, pixels adjacent in the vertical direction with the pixel (i,j) as the center are copied to f(−n:n). This processing is expressed as $$f([-n:n])=I(i[-n:n],j).$$

(S506 to S508):

At step S506, based on the expressions indicated in the first embodiment, Sfk and Sf are obtained, and further the amplitude a is obtained.

At step S507, based on the expressions indicated in the first embodiment, the offset value b and Sf2 are obtained, and further the minimum square error Emin is obtained similarly to the first embodiment.

At step S508, data of the amplitude a is saved in an address for data storage of the amplitude a, which corresponds to (i,j) of an image memory. This processing is expressed as $$Ma(i,j)=a.$$

In addition, data of the minimum square error Emin is saved in an address for data storage of the minimum square error Emin, which corresponds to (i,j) of the image memory. This processing is expressed as $$Me(i,j)=E\text{min}.$$

(S509):

At step S509, i is incremented by +1, processing returns to S502, and the aforementioned processing (processing of S503 to S508) is iterated.

(S510):

At step S510, j is incremented by +1, processing returns to S501, and the aforementioned processing (processing of S502 to S509) is iterated.

(S511 and S512):

At step S511, by setting that j=0, processing is iterated while incrementing j by +1, until j becomes V_SIZE−1.

At step S512, by setting that i=0, processing is iterated while incrementing i by +1, until i becomes H_SIZE−1.

(S513 to S516):

At step S513, whether or not the minimum square error value Me(i,j) in the pixel to be processed (i,j) has the minimum value in the local region. As a result of the judgment, in a case where the minimum square error value Me(i,j) has the minimum value in the local region, s=1 is set as a similarity (step S514), and in the other cases, s=0 is set (step S515).

At step S516, a product of the similarity s and the amplitude Ma(i,j) is stored in an image memory Msa(i, j). That is, processing corresponding to $$Msa(i,j)=s \times Ma(i,j)$$

is executed.

(S517):

At step S517, i is incremented by +1, processing returns to S512, and the aforementioned processing (processing of S513 to S516) is iterated.

(S518):

At step S518, j is incremented by +1, processing returns to S511, and the aforementioned processing (processing of S512 to S517) is iterated.

(S519 and S520):

At step S519, by setting that j=0, processing is iterated while incrementing j by +1, until j becomes V_SIZE−1.

At step S520, by setting that i=0, processing is iterated while incrementing i by +1, until i becomes H_SIZE−1.

(S521 to S523):

At step S521, whether or not to be the horizontal processing is judged.

At steps S522 and S523, information of the product of the amplitude and the similarity in the local region is copied to as(−n:+n). That is, in the case of the horizontal processing, the pixels adjacent in the horizontal direction with the pixel (i,j) as the center are copied to as(−n:+n). In other words, processing corresponding to $$as([-n{:}n])=Mas(i+[-n{:}n],j)$$

is executed (S523).

In the case of the vertical processing, the pixels adjacent in the vertical direction with the pixel (i,j) as the center are copied to as(−n:+n). In other words, processing corresponding to $$as([-n{:}n])=Mas(i,j+[-n{:}n])$$

is executed (S522).

(S524 to S529):

At step S524, a temporary variable tmp is cleared, and at step S525, processing is iterated while incrementing a local reference variable u by +1 from −n to +n. During this loop processing, the difference pattern d(u) and as(u) are multiplied, and resultant values of the multiplication are accumulated to tmp. This corresponds to so-called FIR filter processing.

At a time when the loop processing is finished, tmp is saved in a sharpening component ΔY (S528).

Then, the sharpening component ΔY is added to Y(i,j). That is, processing corresponding to $$Y(i,j)=Y(i,j)+\Delta Y$$

is executed.

Note that, in a case where the horizontal processing is selected in first sharpening processing, data same as that of the input image I(i,j) is stored in Y(i,j) of the right side. In a case where the vertical one is selected in second sharpening processing, a result of the first sharpening processing is stored in Y(i,j) of the right side, and at the second time, a vertical sharpening component is to be newly added.

(S530):

At S530, i is incremented by +1, processing returns to S520, and the aforementioned processing (processing of S521 to S529) is iterated.

(S531):

At S531, j is incremented by +1, processing returns to S519, and the aforementioned processing (processing of S520 to S530) is iterated.

In the above-described manner, the sharpening processing of steps S5 and S6 (the horizontal sharpening processing and the vertical sharpening processing) is executed.

As described above, in the image processing method of the present embodiment, the part having the signal waveform similar to a signal processing waveform which is generated when the downscaling processing is performed and the upscaling processing is further performed is detected, and the lost high frequency component of only the detected part is adjusted so that amplitude thereof becomes equivalent to that of a signal of the lost high frequency component, and added to the input image signal. Accordingly, in the image processing method of the present embodiment, it is possible to reproduce an original thin linear image region from a linear image region, which has become thick due to upscaling processing for a low-resolution image, without enhancing a noise component unnecessarily or causing overshoot excessively as the conventional technique. As a result thereof, an image signal (video signal) acquired by the image processing method of the present embodiment becomes an image signal (video signal) having excellent definition and a high quality.

Other Embodiments

In the aforementioned embodiments (including the modified examples), description has been given for a case where the low-resolution pattern signal PtnL and the difference pattern signal PtnDiff are acquired by executing predetermined processing for the high-resolution pattern signal PtnH. However, without limitation thereto, a part or all of the high-resolution pattern signal PtnH, the low-resolution pattern signal PtnL, and the difference pattern signal PtnDiff may be set in advance. In this case, a configuration obtained by omitting the pattern generation unit 200 from the image processing system is also possible, for example.

Moreover, patterns (signal waveforms) of a part or all of the high-resolution pattern signal PtnH, the low-resolution pattern signal PtnL, and the difference pattern signal PtnDiff may be changed according to setting.

In addition, the first embodiment (including the modified examples) has been described by assuming the processing in the horizontal direction in the image processing system, but is not limited thereto, and processing in the vertical direction may be executed in the image processing system in a way of thinking similar to the above.

Further, the image processing system, the image processing device, and the image processing method may be realized by combining a part or all of the aforementioned embodiments (including the modified examples).

Furthermore, a part or all of the image processing system and the image processing device of the embodiments may be realized as an integrated circuit (for example, an LSI, a system LSI, or the like).

A part or all of the processing of each functional block of the embodiments may be realized by a program. Moreover, a part or all of the processing of each functional block of the embodiments may be executed by a central processing unit (CPU) in a computer. The program for performing each processing may be stored in a storage device such as a hard disk or a ROM, and the central processing unit (CPU) may read the program from the ROM or a RAM for execution.

Moreover, each processing of the embodiments may be realized by hardware, or may be realized by software (including the case of being realized by OS (Operating System), middleware, or a predetermined library together). Furthermore, each processing may be realized by mixed processing of software and hardware.

Note that, in a case where the image processing system and the image processing device according to the embodiments are realized by hardware, it is needless to say that it is necessary to perform timing adjustment for performing each processing. In the embodiments, details of the timing adjustment of various signals which occur in actual hardware design are omitted for convenience of the description. In addition, a delay unit and the like for performing the timing adjustment are omitted in the drawings as well.

An execution order of the processing method in the embodiments is not necessarily limited to the description of the embodiments, and the execution order may be switched without departing from the gist of the invention.

A computer program which causes a computer to execute the above-described method and a computer readable recording medium which records the program therein are included in the scope of the invention. Here, examples of the computer readable recording medium include a flexible disk, a hard disk, a CD-ROM, an MO, a DVD, a large-capacity DVD, a next-generation DVD, and a semiconductor memory.

The computer program is not limited to what is recorded in the recording medium, and may be transmitted via an electric communication line, a wireless or wired communication line, a network represented by the Internet, or the like.

Note that, the specific configuration of the invention is not limited to the above-described embodiments, and various changes and modifications can be made without departing from the gist of the invention.

[Additional Notes]

Note that, the invention is able to be expressed also as follows.

A first invention provides an image processing device which sharpens an input image and which includes an amplitude estimation unit, a similarity calculation unit, a multiplier, an FIR filter unit, and an adder.

The amplitude estimation unit acquires a magnification a so that a difference between an adjusted low-resolution pattern data sequence acquired by multiplying a low-resolution pattern data sequence, which is acquired by executing predetermined processing with respect to a high-resolution pattern data sequence, by the magnification a and a pixel data sequence in a local region that is a predetermined range of the input image, which includes a pixel to be processed, is equal to or less than a predetermined value.

The similarity calculation unit sets a similarity value of the pixel to be processed to be a value indicating that a degree of similarity between the adjusted low-resolution pattern data sequence and the pixel data sequence is higher as the difference between the adjusted low-resolution pattern data sequence and the pixel data sequence is smaller in the local region.

The multiplier multiplies the magnification a and the similarity for each pixel to be processed.

The FIR filter unit executes FIR filter processing with respect to a multiplication value of the magnification a and the similarity, which is acquired by the multiplier, with a difference pattern data sequence acquired by subtracting the high-resolution pattern data sequence from the low-resolution pattern data sequence as an FIR filter coefficient, and thus the FIR filter unit acquires high frequency component data $\Delta D$ of the pixel to be processed, for each pixel to be processed.

The adder adds pixel data of the pixel to be processed and the high frequency component data $\Delta D$ of the pixel to be processed, which is acquired by the FIR filter processing, for each pixel to be processed.

In the image processing device, a part having a signal waveform similar to a signal processing waveform which is generated when downscaling processing is performed and upscaling processing is further performed is detected, and a lost high frequency component which is lost only in the detected part is adjusted so that amplitude thereof becomes equivalent to that of a signal of the lost high frequency component, and added to an input image signal. Accordingly, in the image processing device, it is possible to reproduce an original thin linear image region from a linear image region, which has become thick due to upscaling processing for a low-resolution image, without enhancing a noise component unnecessarily or causing overshoot excessively as the conventional technique. As a result thereof, an image signal (image data) acquired by the image processing device becomes an image signal (image data) having excellent definition and a high quality.

Note that, a concept of the "local region that is a predetermined range of the input image, which includes a pixel to be processed" includes, for example, (1) an image region composed of pixels of 2n+1 pixels (n: natural number) in a horizontal direction of the image with the pixel to be processed as the center thereof, (2) an image region composed of pixels of 2n+1 pixels (n: natural number) in a vertical direction of the image with the pixel to be processed as the center thereof, (3) an image region composed of (2n+1) pixels×(2n+1) pixels with the pixel to be processed as the center thereof, and the like.

A second invention provides the image processing device of the first invention, in which the amplitude estimation unit acquires the low-resolution pattern data sequence by performing downscaling processing and then performing upscaling processing for the high-resolution pattern data sequence.

Accordingly, in this image processing device, it is possible to acquire the low-resolution pattern data sequence by performing downscaling processing and then performing upscaling processing with respect to the high-resolution pattern data sequence.

A third invention provides the image processing device of the first invention, in which the amplitude estimation unit acquires the low-resolution pattern data sequence by executing low pass filter processing with respect to the high-resolution pattern data sequence.

In this image processing device, it is possible to acquire the low-resolution pattern data sequence by executing the low pass filter processing, thus making it possible to acquire the low-resolution pattern data sequence with a small operation amount.

Note that, in the "low pass filter processing", it is preferable to set a cutoff frequency of the low pass filter processing such that a signal waveform (data sequence pattern) which is acquired when the low pass filter processing is executed for the high-resolution pattern data sequence and a signal waveform (data sequence pattern) which is acquired in the case of performing downscaling processing and then performing upscaling processing with respect to the high-resolution pattern data sequence are similar to each other (for example, such that a difference (error) between the two (two signal waveforms) falls within a predetermined range).

A fourth invention provides the image processing device of any of the first to third inventions, in which the similarity calculation unit (1) sets, with respect to a pixel which has a minimum difference between the adjusted low-resolution pattern data sequence and the pixel data sequence in the local region, a similarity corresponding to the pixel to be a first value, and (2) sets, with respect to a pixel which does not have the minimum difference between the adjusted low-resolution pattern data sequence and the pixel data sequence in the local region, a similarity corresponding to the pixel to be a value smaller than the first value.

Accordingly, in this image processing device, it is possible to set the similarity of the pixel which has the minimum difference between the adjusted low-resolution pattern data sequence and the pixel data sequence in the local region to be a great value.

A fifth invention provides the image processing device of any of the first to fourth inventions, in which the amplitude estimation unit obtains the magnification a by a least squares method.

A sixth invention provides the image processing device of any of the first to fifth inventions, in which the similarity calculation unit calculates a minimum square error value Emin of the adjusted low-resolution pattern data sequence which is adjusted with the magnification a calculated by the least squares method and the pixel data sequence in the local region for each pixel in the local region, and (1) sets a similarity of a pixel, the minimum square error value Emin of which is a minimum value in the local region, to be a first value, and (2) sets a similarity of a pixel, the minimum square error value Emin of which is not the minimum value in the local region, to be a value smaller than the first value.

Accordingly, in this image processing device, it is possible to appropriately set the similarity of the pixel to be processed by using the minimum square error value Emin of the adjusted low-resolution pattern data sequence which is adjusted with the magnification a calculated by the least squares method and the pixel data sequence in the local region.

A seventh invention provides the image processing device of any of the first to sixth inventions, in which the similarity calculation unit sets the similarity of the pixel to be processed to be a greater value as the difference between the adjusted low-resolution pattern data sequence adjusted with the magnification a and the pixel data sequence in the local region is smaller.

Accordingly, in this image processing device, it is possible to set the similarity having an intermediate value (for example, an intermediate value between 0 and 1).

An eighth invention provides the image processing device of any of the first to seventh inventions, in which the similarity calculation unit (1) sets a similarity corresponding to the pixel to be processed to be a first value in a case where the pixel data of the pixel to be processed has a peak value in the local region, and (2) sets the similarity corresponding to the pixel to be processed to be a value smaller than the first value in a case where the pixel data of the pixel to be processed does not have the peak value in the local region.

Accordingly, in this image processing device, it is possible to set the similarity simply. As a result, it is possible to, for example, reduce a hardware scale in a case where the image processing device is realized by hardware.

A ninth invention provides an image processing method of sharpening an input image, including:

an amplitude estimation step of acquiring a magnification a so that a difference between an adjusted low-resolution pattern data sequence acquired by multiplying a low-resolution pattern data sequence, which is acquired by executing predetermined processing (for example, (1) processing of performing downscaling processing and then performing upscaling processing or (2) low pass filter processing) with respect to a high-resolution pattern data sequence, by the magnification a and a pixel data sequence in a local region that is a predetermined range of the input image, which includes a pixel to be processed, is equal to or less than a predetermined value;

a similarity calculation step of setting a similarity value of the pixel to be processed to be a value indicating that a degree of similarity between the adjusted low-resolution pattern data sequence and the pixel data sequence is higher as the difference between the adjusted low-resolution pattern data sequence and the pixel data sequence is smaller in the local region;

a multiplication step of multiplying the magnification a and the similarity for each pixel to be processed;

an FIR filter step of executing FIR filter processing with respect to a multiplication value of the magnification a and the similarity, which is acquired by the multiplication step, with a difference pattern data sequence acquired by subtracting the high-resolution pattern data sequence from the low-resolution pattern data sequence as an FIR filter coefficient, and thereby acquiring high frequency component data $\Delta D$ of the pixel to be processed, for each pixel to be processed; and an addition step of adding pixel data of the pixel to be processed and the high frequency component data $\Delta D$ of the pixel to be processed, which is acquired by the FIR filter processing, for each pixel to be processed.

INDUSTRIAL APPLICABILITY

The invention is able to realize an image processing device and an image processing method which are capable of reproducing an original thin linear image region from a linear image region, which has become thick due to upscaling processing for a low-resolution image, without enhancing a noise component unnecessarily or causing overshoot excessively. Thus, the invention is useful in a field of a video related industry, and is able to be implemented in this field.

REFERENCE SIGNS LIST

1000 image processing system
100 image processing unit (image processing device)
1 amplitude estimation unit
2, 2A similarity calculation unit
3 multiplier
4 FIR filter unit
5 adder

The invention claimed is:

1. An image processing device which sharpens an input image, comprising:

an amplitude estimator which acquires a magnification a so that a difference between an adjusted low-resolution pattern data sequence acquired by multiplying a low-resolution pattern data sequence, which is acquired by executing predetermined processing with respect to a high-resolution pattern data sequence, by the magnification a and a pixel data sequence in a local region that is a predetermined range of the input image, which includes a pixel to be processed, is equal to or less than a predetermined value;

a similarity calculator which sets a similarity value of the pixel to be processed to be a value indicating that a degree of similarity between the adjusted low-resolution pattern data sequence and the pixel data sequence is higher as the difference between the adjusted low-resolution pattern data sequence and the pixel data sequence is smaller in the local region;

a multiplier which multiplies the magnification a and the similarity for each pixel to be processed;

an FIR filter which executes FIR filter processing with respect to a multiplication value of the magnification a and the similarity, which is acquired by the multiplier, with a difference pattern data sequence acquired by subtracting the high-resolution pattern data sequence from the low-resolution pattern data sequence as an FIR filter coefficient, and thus the FIR filter acquires high frequency component data $\Delta D$ of the pixel to be processed, for each pixel to be processed; and an adder which adds pixel data of the pixel to be processed and the high frequency component data $\Delta D$ of the pixel to be processed, which is acquired by the FIR filter, for each pixel to be processed.

2. The image processing device according to claim 1, wherein the amplitude estimator acquires the low-resolution pattern data sequence by performing downscaling processing and then performing upscaling processing for the high-resolution pattern data sequence.

3. The image processing device according to claim 1, wherein
the amplitude estimator acquires the low-resolution pattern data sequence by executing low pass filter processing with respect to the high-resolution pattern data sequence.

4. The image processing device according to claim 1, wherein
the similarity calculator (1) sets, with respect to a pixel which has a minimum difference between the adjusted low-resolution pattern data sequence and the pixel data sequence in the local region, a similarity corresponding to the pixel to be a first value, and (2) sets, with respect to a pixel which does not have the minimum difference between the adjusted low-resolution pattern data sequence and the pixel data sequence in the local region, a similarity corresponding to the pixel to be a value smaller than the first value.

5. The image processing device according to claim 1, wherein
the amplitude estimator obtains the magnification a by using a least squares method.

6. The image processing device according to claim 1, wherein
the similarity calculator calculates a minimum square error value Emin of the adjusted low-resolution pattern data sequence which is adjusted with the magnification a calculated by using the least squares method and the pixel data sequence in the local region for each pixel in the local region, and the similarity calculator (1) sets a similarity of a pixel, the minimum square error value Emin of which is a minimum value in the local region, to be a first value, and (2) sets a similarity of a pixel, the minimum square error value Emin of which is not the minimum value in the local region, to be a value smaller than the first value.

7. The image processing device according to claim 1, wherein
the similarity calculator sets the similarity of the pixel to be processed to be a greater value as the difference between the adjusted low-resolution pattern data sequence adjusted with the magnification a and the pixel data sequence in the local region is smaller.

8. The image processing device according to claim 1, wherein
the similarity calculator (1) sets a similarity corresponding to the pixel to be processed to be a first value in a case where the pixel data of the pixel to be processed has a peak value in the local region, and (2) sets the similarity corresponding to the pixel to be processed to be a value smaller than the first value in a case where the pixel data of the pixel to be processed does not have the peak value in the local region.

9. An image processing method of sharpening an input image, including:

an amplitude estimation step of acquiring a magnification a so that a difference between an adjusted low-resolution pattern data sequence acquired by multiplying a low-resolution pattern data sequence, which is acquired by executing predetermined processing with respect to a high-resolution pattern data sequence, by the magnification a and a pixel data sequence in a local region that is a predetermined range of the input image, which includes a pixel to be processed, is equal to or less than a predetermined value;

a similarity calculation step of setting a similarity value of the pixel to be processed to be a value indicating that a degree of similarity between the adjusted low-resolution pattern data sequence and the pixel data sequence is higher as the difference between the adjusted low-resolution pattern data sequence and the pixel data sequence is smaller in the local region;

a multiplication step of multiplying the magnification a and the similarity for each pixel to be processed;

an FIR filter step of executing FIR filter processing with respect to a multiplication value of the magnification a and the similarity, which is acquired by the multiplication step, with a difference pattern data sequence acquired by subtracting the high-resolution pattern data sequence from the low-resolution pattern data sequence as an FIR filter coefficient, and thereby acquiring high frequency component data $\Delta D$ of the pixel to be processed, for each pixel to be processed; and an addition step of adding pixel data of the pixel to be processed and the high frequency component data $\Delta D$ of the pixel to be processed, which is acquired by the FIR filter step, for each pixel to be processed.

* * * * *